US012707374B2

(12) United States Patent
Ni et al.

(10) Patent No.: US 12,707,374 B2
(45) Date of Patent: Aug. 11, 2026

(54) TWS HEADSET CONNECTION METHOD AND DEVICE

(71) Applicant: HUAWEI TECHNOLOGIES CO., LTD., Shenzhen (CN)

(72) Inventors: Guanjun Ni, Shanghai (CN); Yuhong Zhu, Shanghai (CN); Xiaoqiang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 444 days.

(21) Appl. No.: 18/268,767

(22) PCT Filed: Dec. 17, 2021

(86) PCT No.: PCT/CN2021/139282
§ 371 (c)(1),
(2) Date: Jun. 21, 2023

(87) PCT Pub. No.: WO2022/135303
PCT Pub. Date: Jun. 30, 2022

(65) Prior Publication Data

US 2024/0040481 A1 Feb. 1, 2024

(30) Foreign Application Priority Data

Dec. 25, 2020 (CN) ........................ 202011563540.2

(51) Int. Cl.
*H04W 48/10* (2009.01)
*H04R 1/10* (2026.01)

(52) U.S. Cl.
CPC .......... *H04W 48/10* (2013.01); *H04R 1/1016* (2013.01); *H04R 2201/107* (2013.01); *H04R 2420/07* (2013.01)

(58) Field of Classification Search
CPC ................ H04W 48/10; H04R 1/1016; H04R 2201/107; H04R 2420/07
(Continued)

(56) References Cited

U.S. PATENT DOCUMENTS 10,206,170 B2 * 2/2019 Mathews .......... H04M 1/72412
10,349,259 B2 * 7/2019 Watson ................ H04W 8/005
(Continued)

FOREIGN PATENT DOCUMENTS

CN 111277941 A * 6/2020 .......... H04R 29/004
EP 1549094 A1 * 6/2005 ........... H04W 68/00

OTHER PUBLICATIONS

Everything You Need to Know about Bluetooth LE Advertising (Sep. 2020) (Year: 2020).*
(Continued)

*Primary Examiner* — Rafael Pérez-Gutiérrez
*Assistant Examiner* — Aaron C. Deditch
(74) *Attorney, Agent, or Firm* — WOMBLE BOND DICKINSON (US) LLP

(57) ABSTRACT

This application discloses a TWS headset connection method, including: A TWS headset includes a first earbud and a second earbud; the first earbud performs scanning at a first scanning duty cycle, where the first scanning duty cycle is 100%; the second earbud performs advertising; if the first earbud does not find the advertising through scanning, the first earbud determines or judges whether scanning duration of the first earbud exceeds an advertising period of the second earbud; and if the scanning duration of the first earbud exceeds the advertising period of the second earbud, the first earbud is connected to an electronic device that has performed a Bluetooth pairing with the first earbud last time;
(Continued)

or if the scanning duration of the first earbud does not exceed the advertising period of the second earbud, the first earbud continues scanning.

20 Claims, 13 Drawing Sheets

(58) Field of Classification Search
USPC .......................................................... 455/434
See application file for complete search history.

(56) References Cited

U.S. PATENT DOCUMENTS 10,375,741 B2 * 8/2019 Paycher ................ H04W 76/14
10,764,941 B2 * 9/2020 Paycher ................ H04W 8/005
10,834,567 B2 * 11/2020 Watson ................... H04W 4/08
12,041,406 B2 * 7/2024 Liu ...................... H04R 1/1041
12,047,760 B2 * 7/2024 Yin ....................... H04W 76/15
12,250,335 B2 * 3/2025 Peng ............... H04M 1/724097
2021/0037582 A1 * 2/2021 Kim ...................... H04W 12/55

OTHER PUBLICATIONS

How Bluetooth Low Energy Works: Advertisements (Part 1) (Apr. 21, 2020) (Year: 2020).*
CN111277941A—Google Patents Machine Translation (Year: 2020).*
Bluetooth Core 5.2 Feature Overview (2020) (Year: 2020).*
Bluetooth 5.0 vs Bluetooth 5.2 (2020) (Year: 2020).*
Daigle et al., Optimizing Scan Times of BLE Scanning Systems (IEEE 2020) (Aug. 3-6, 2020) (Year: 2020).*
I7 TWS Instructions Manual: Step-By-Step Charging & Pairing Instructions (Jun. 7, 2020) (Year: 2020).*
Why Your Bluetooth Headphones or Earbuds are not Connecting to Your Smartphone (May 6, 2020) (Year: 2020).*

* cited by examiner

TWS HEADSET CONNECTION METHOD AND DEVICE

This application is a national stage of International Application No. PCT/CN2021/139282, filed on Dec. 17, 2021, which claims priority to Chinese Patent Application No. 202011563540.2, filed on Dec. 25, 2020. All of the aforementioned applications are hereby incorporated by reference in their entireties.

TECHNICAL FIELD

Embodiments of this application relate to the field of electronic technologies, and in particular, to a TWS headset connection method and a device.

BACKGROUND

As users impose increasingly high requirements for ease of use of headsets, wireless headsets have been favored by more users. Particularly, a true wireless stereo (TWS) headset includes two earbuds, and the two earbuds do not need to be connected through a wire. Therefore, it is more convenient for a user to use.

SUMMARY

Embodiments of this application provide a TWS headset connection method and a device, to quickly establish Bluetooth connections between TWS earbuds and between the TWS headset and another electronic device (for example, a mobile phone), and reduce power consumption of the TWS headset.

According to a first aspect, this application discloses a TWS headset connection method, including:

- a TWS headset includes a first earbud and a second earbud; the first earbud performs scanning at a first scanning duty cycle, where the first scanning duty cycle is 100%;
- the second earbud performs advertising;
- if the first earbud does not find the advertising through scanning, the first earbud determines or judges whether scanning duration of the first earbud exceeds an advertising period of the second earbud; and
- if the scanning duration of the first earbud exceeds the advertising period of the second earbud, the first earbud is connected to an electronic device (for example, a mobile phone) that has performed a Bluetooth pairing with the first earbud last time; or
- if the scanning duration of the first earbud does not exceed the advertising period of the second earbud, the first earbud continues scanning.

In some implementations, the TWS headset further includes a headset storage box, and the headset storage box stores the first earbud and the second earbud.

In some other implementations, the first earbud performs scanning at the first scanning duty cycle when the first earbud is taken out of the headset storage box.

In some implementations, a scanWindow parameter of the first earbud is set to be greater than the advertising period of the second earbud.

In some other implementations, if the first earbud finds, through scanning, the advertising made by the second earbud, the first earbud initiates a Bluetooth connection to the second earbud; and the first earbud establishes the Bluetooth connection to the second earbud.

In some implementations, after the first earbud establishes the Bluetooth connection to the second earbud, if a distance between the first earbud and the second earbud exceeds an effective range of the Bluetooth connection, the Bluetooth connection between the first earbud and the second earbud ends; the first earbud initiates paging to the second earbud within an interval time $t_n$, where a quantity of paging times is n, and the interval time $t_n$ is greater than an interval time $t_{n-1}$; and when the first earbud performs paging for the $n^{th}$ time, the first earbud establishes a Bluetooth connection to the second earbud.

In some other implementations, after the first earbud establishes the Bluetooth connection to the second earbud, if a distance between the first earbud and the second earbud exceeds an effective range of the Bluetooth connection, the Bluetooth connection between the first earbud and the second earbud ends; the first earbud initiates paging to the second earbud, where a paging period is t; and if the first earbud and the second earbud fail in establishing a Bluetooth connection within the period t, the first earbud enters a scanning state, and scans the advertising made by the second earbud.

According to a second aspect, this application discloses a TWS headset, including:

- a first earbud, a second earbud, and a headset storage box, where a microphone and a telephone receiver are disposed on both the first earbud and the second earbud; and
- the first earbud, the second earbud, and the headset storage box further include: a wireless communication module; one or more processors; a memory; and one or more computer programs, where the one or more computer programs are stored in the memory, the one or more computer programs include instructions, and when the instructions are executed by the TWS headset, the TWS headset is enabled to perform the method according to the first aspect.

According to a third aspect, this application discloses a computer-readable storage medium. The computer-readable storage medium stores a computer program, and when the computer program is run on a computer, the computer is enabled to perform the method according to the first aspect.

DESCRIPTION OF EMBODIMENTS

The following describes technical solutions in embodiments of this application with reference to the accompanying drawings in embodiments of this application. In description in embodiments of this application, "/" represents "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

Figure 1A:
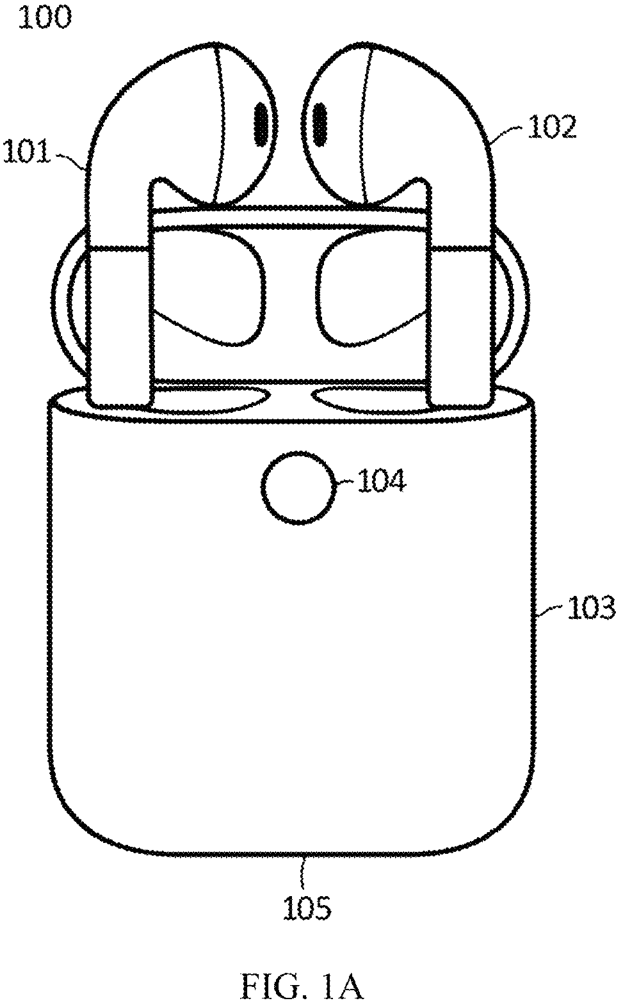
FIG. 1A is a schematic diagram of a partial structure of a TWS headset according to an embodiment of this application.

Generally, a TWS headset 100 includes two earbuds (for example, a left earbud 101 and a right earbud 102 shown in FIG. 1A) and one headset storage box (for example, a headset storage box 103 shown in FIG. 1). With reference to FIG. 1A, the headset storage box 103 may be configured to store the left earbud 101 and the right earbud 102 of the TWS headset 100, and the headset storage box 103 may be further configured to charge the left earbud 101 and the right earbud 102. In some embodiments, at least one touchable button 104 may be further disposed in the headset storage box 103, and is configured to establish a pairing between the TWS headset 100 and a mobile phone and perform operations such as a re-pairing between the left earbud 101 and the right earbud 102. A charging port 105 may be further disposed in the headset storage box 103, and is configured to charge the headset storage box 103. The headset storage box 103 may further include a plurality of sensors, such as a Hall effect sensor and an acceleration sensor. It can be understood that the headset storage box 103 may further include other controls. This is not limited in this application. In some embodiments, the headset storage box 103 may further include components such as a processor and a memory. The memory may be configured to store computer program code, and the processor of the headset storage box 103 controls the computer program code to be executed, to implement a function of the headset storage box 103. For example, when a user opens a box cover of the headset storage box, in response to an operation performed by the user for opening the box cover, the processor of the headset storage box 103 may execute the computer program code stored in the memory, to send a pairing command and the like to the left and right earbuds of the TWS headset 100.

Figure 1B:
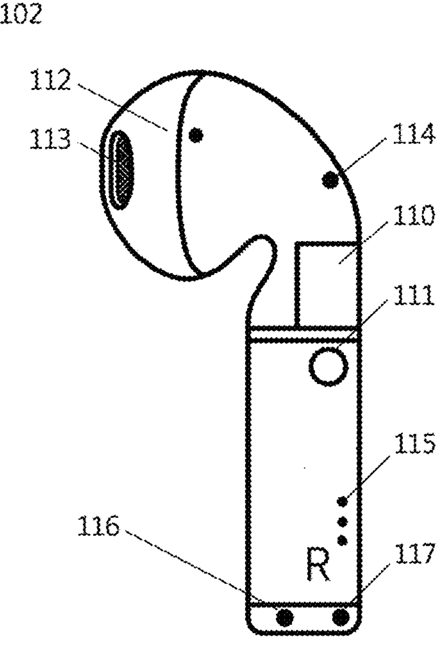
FIG. 1B is a schematic diagram of a partial structure of a single earbud in a TWS headset according to an embodiment of this application.

FIG. 1B is a schematic diagram of a right earbud 102. It can be understood that the earbud may be alternatively a left earbud 101. In some embodiments, the right earbud 102 may include an input/output interface 117. The input/output interface 117 may be configured to provide any wired connection between the earbud of the TWS headset 100 and a headset storage box (for example, the foregoing headset storage box 103). In some embodiments, the input/output interface 117 may be an electrical connector. When the earbud of the TWS headset 100 is placed in the headset storage box, the earbud may be electrically connected to the headset storage box (for example, an input/output interface included in the headset storage box) through the electrical connector. After the electrical connection is established, the headset storage box may charge a power supply 127 of the left and right earbuds of the TWS headset 100. After the electrical connection is established, the left and right earbuds of the TWS headset 100 may further perform data communication with the headset storage box. For example, the left and right earbuds of the TWS headset 100 may receive a pairing instruction from the headset storage box through the electrical connector. The pairing command is used to instruct the left and right earbuds of the TWS headset 100 to start a wireless communication module 124, so that the left and right earbuds of the TWS headset 100 can perform a pairing connection with an electronic device (for example, the mobile phone) by using a corresponding wireless communication protocol (for example, Bluetooth or Wi-Fi). The earbud 102 may include a telephone receiver 125, a microphone 116, the input/output interface 117, an indicator light 115, a display screen 110, a touch key 111, an optical proximity sensor 112, and the like. The touch key 111 may be used in cooperation with a touch sensor, and is configured to trigger operations such as pausing, playing, recording, turning on the microphone, and turning off the microphone.

It can be understood that, by using the wireless communication module 124, the left and right earbuds of the TWS headset 100 may alternatively establish a wireless connection to the headset storage box, and implement a charging or data communication function.

Figure 1C:
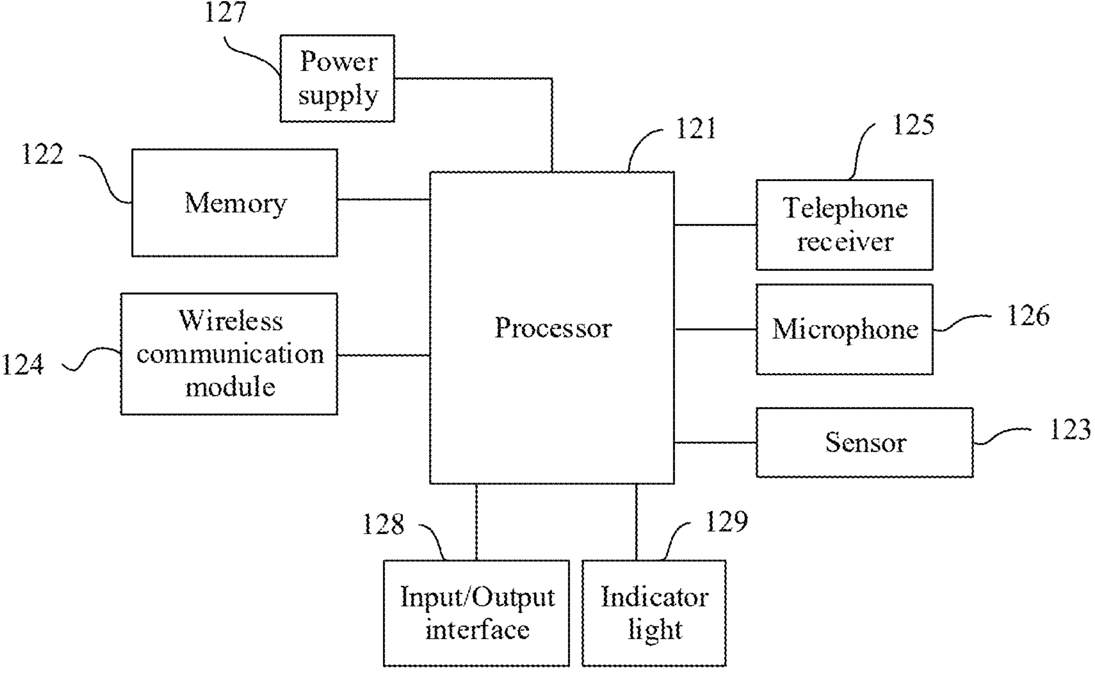
FIG. 1C is a schematic diagram of a hardware structure of a TWS headset according to an embodiment of this application.

For example, FIG. 1C is a schematic diagram of a structure of a main body, that is, a left earbud 101 or a right earbud 102, of a TWS headset 100. As shown in FIG. 1C, the earbud of the TWS headset may include a processor 121, a memory 122, a sensor 123, a wireless communication module 124, a telephone receiver 125, a microphone 126, and a power supply 127.

The memory 122 may be configured to store computer program code, which is, for example, used for establishing a wireless connection to the other earbud of the TWS headset 100 and enabling the earbud to perform a pairing connection with the electronic device (for example, the mobile phone). The memory 122 may further store a Bluetooth address used to uniquely identify the earbud, and store a Bluetooth address of the other earbud of the TWS headset. In addition, the memory 122 may further store a pairing history of the electronic device that has been successfully paired with the earbud. For example, the pairing history may include a Bluetooth address of the electronic device that has been successfully paired with the earbud. Based on the pairing history, the earbud can automatically be connected to the electronic device that has been paired with the earbud. The Bluetooth addresses may be media access control (MAC) addresses.

The processor 121 may execute the computer program code to implement a function of the TWS headset 100 in this embodiment of this application, for example, implement a wireless pairing connection between each earbud of the TWS headset 100 and the electronic device (for example, the mobile phone).

The sensor 123 may be a distance sensor or an optical proximity sensor. The earbud may determine, by using the sensor 123, whether the earbud is worn by a user. For example, the earbud may detect, by using the optical proximity sensor, whether there is an object near the earbud, to determine whether the earbud is worn by the user. When determining that the earbud is worn, the earbud may start the telephone receiver 125. In some embodiments, the earbud may further include a bone conduction sensor, and the bone conduction sensor and the earbud are combined into a bone conduction headset. The earbud may obtain a voice signal by parsing a vibration signal of a vibrating bone of a vocal-cord part obtained by the bone conduction sensor, to implement a voice function. In some other embodiments, the earbud may further include a fingerprint sensor, configured to detect a user fingerprint, identify a user identity, perform a control operation on the earbud, or the like. In still some other embodiments, the earbud may further include an ambient light sensor, and may adaptively adjust some parameters based on sensed ambient light brightness.

The wireless communication module 124 is configured to support wireless data exchange between the current earbud and the other earbud of the TWS headset, and between the current earbud and the electronic device (for example, the mobile phone). In some embodiments, the wireless communication module 124 may be a Bluetooth transceiver. The left and right earbuds of the TWS headset may establish a wireless connection to the electronic device through the Bluetooth transceiver, to implement short-range data exchange between the earbuds and the electronic device.

The at least telephone receiver 125, which may also be referred to as an "earpiece", may be configured to convert an audio electrical signal into a sound signal and play the sound signal. For example, when the left and right earbuds of the TWS headset 100 are used as an audio output device of the electronic device, the telephone receiver 125 may convert a received audio electrical signal into a sound signal and play the sound signal.

The at least microphone 126, which may also be referred to as a "mic" or a "mike", is configured to convert a sound signal into an audio electrical signal. For example, when the left and right earbuds of the TWS headset 100 are used as an audio input device of the electronic device, in a process in which the user speaks (for example, makes a call or sends a voice message), the microphone 126 may collect a sound signal of the user and convert the sound signal into an audio electrical signal. The audio electrical signal is audio data in this embodiment of this application.

The power supply 127 may be configured to supply power to the components included in the left and right earbuds of the TWS headset 100. In some embodiments, the power supply 127 may be a battery, for example, a rechargeable battery.

It can be understood that the structure illustrated in this embodiment of this application does not constitute any specific limitation on the TWS headset 100. The TWS headset 100 may include more or fewer components than those shown in FIG. 1C, a combination of two or more components, or a different arrangement of the components. For example, the earbud may further include components, such as an indicator light 129 (that is, the indicator light 115 in FIG. 1B) that may indicate a quantity of electricity, a connection status, or the like of the earbud, a display screen (that is, the display screen 110 in FIG. 1B) configured to prompt the user with related information, an air filter (not shown in the figure) used in cooperation with the earpiece, and a motor. Various components shown in FIG. 1C may be implemented by using hardware including one or more signal processors or application-specific integrated circuits, software, or a combination of hardware and software.

It should also be noted that the structures shown in FIG. 1A, FIG. 1B, and FIG. 1C are merely used as examples for description, and do not constitute any limitation on structures or functions of the TWS headset and the headset storage box.

Figure 2:
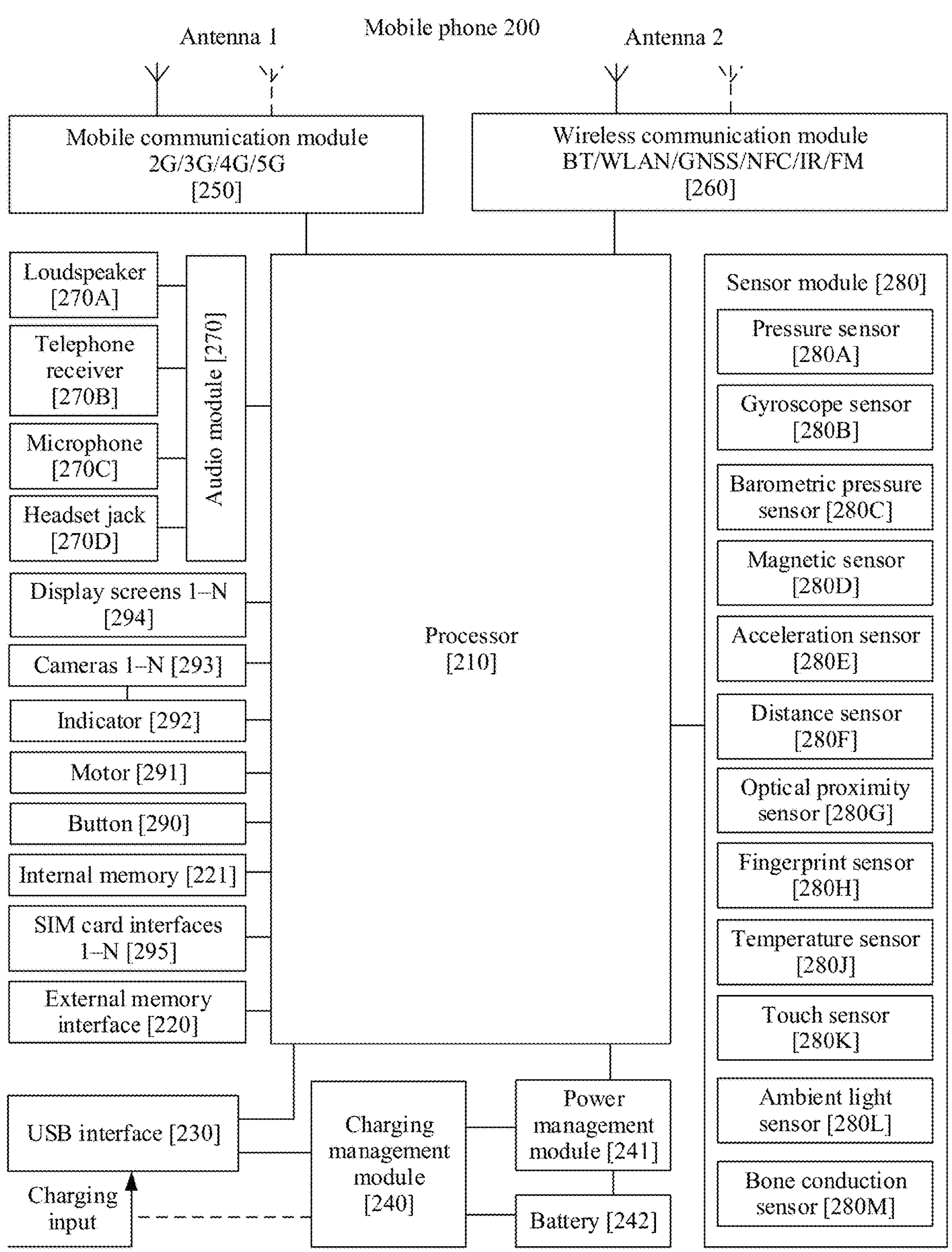
FIG. 2 is a schematic diagram of a hardware structure of a mobile phone according to an embodiment of this application.

That the foregoing electronic device connected to the TWS headset 100 is a mobile phone is used as an example. For example, when the electronic device is a mobile phone 200, FIG. 2 shows a schematic diagram of a structure of the mobile phone 200. The mobile phone 200 may include a processor 210, an external memory interface 220, an internal memory 221, a universal serial bus (USB) interface 230, a charging management module 240, a power management module 241, a battery 242, an antenna 1, an antenna 2, a mobile communication module 250, a wireless communication module 260, an audio module 270, a loudspeaker 270A, a telephone receiver 270B, a microphone 270C, a headset jack 270D, a sensor module 280, a button 290, a motor 291, an indicator 292, a camera 293, a display screen 294, a subscriber identity module (SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It can be understood that the structure illustrated in this embodiment of this application does not constitute any specific limitation on the mobile phone 200. In some other embodiments of this application, the mobile phone 200 may include more or fewer components than those shown in the figure, a combination of some components, splitting of some components, or a different arrangement of the components. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone 200. The controller may generate an operation control signal based on instruction operation code and a sequence signal, to control instruction fetching and instruction execution.

The processor 210 may be further provided with a memory, configured to store instructions and data. In some embodiments, the memory in the processor 110 is a cache memory. The memory may store instructions or data recently used or cyclically used by the processor 110. If the processor 210 needs to use the instructions or data again, the processor 210 may directly invoke the instructions or data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 210 may include a plurality of I2C buses. The processor 210 may be separately coupled to the touch sensor 280K, a charger, a flashlight, the camera 293, and the like through different I2C bus interfaces. For example, the processor 210 may be coupled to the touch sensor 280K through an I2C interface, so that the processor 210 communicates with the touch sensor 280K through the I2C bus interface, to implement a touch function of the mobile phone 200.

The I2S interface may be used for audio communication. In some embodiments, the processor 210 may include a plurality of I2S buses. The processor 210 may be coupled to the audio module 270 through an I2S bus, to implement communication between the processor 110 and the audio module 270. In some embodiments, the audio module 270 may transmit an audio signal to the wireless communication module 260 through an I2S interface, to implement functions of answering a call and the like by using a Bluetooth headset.

The PCM interface may also be used for audio communication, to perform sampling, quantization, and encoding on an analog signal. In some embodiments, the audio module 270 may be coupled to the wireless communication module 260 through the PCM bus interface. In some embodiments, the audio module 270 may alternatively transmit an audio signal to the wireless communication module 260 through the PCM interface, to implement a function of answering a call by using a Bluetooth headset. Both the I2S interface and the PCM interface may be used for audio communication.

The UART interface is a universal serial data bus for asynchronous communication. The bus may be a two-way communication bus that converts to-be-transmitted data between serial communication and parallel communication. In some embodiments, the UART interface is usually configured to connect the processor 210 to the wireless communication module 260. For example, the processor 210 communicates with a Bluetooth module in the wireless communication module 260 through the UART interface, to implement a Bluetooth function. In some embodiments, the audio module 270 may transmit an audio signal to the wireless communication module 260 through the UART interface, to implement a function of playing music by using a Bluetooth headset.

The MIPI interface may be configured to connect the processor 210 to peripheral components such as the display screen 294 and the camera 293. The MIPI interface includes a camera serial interface (CSI), a display serial interface (DSI), and the like. In some embodiments, the processor 210 communicates with the camera 293 through the CSI interface, to implement a photographing function of the mobile phone 100. The processor 210 communicates with the display screen 294 through the DSI interface, to implement a display function of the mobile phone 200.

The GPIO interface may be configured by using software. The GPIO interface may be configured as a control signal path, or may be configured as a data signal path. In some embodiments, the GPIO interface may be configured to connect the processor 210 to the camera 293, the display screen 294, the wireless communication module 260, the audio module 270, the sensor module 280, and the like. The GPIO interface may be further configured as an I2C interface, an I2S interface, a UART interface, a MIPI interface, or the like.

The USB interface 230 is an interface complying with the USB standard specification, and may be specifically a mini USB interface, a micro USB interface, a USB type C interface, or the like. The USB interface 230 may be configured to connect to the charger to charge the mobile phone 100, may also be configured to transmit data between the mobile phone 200 and a peripheral device, and may also be configured to connect to the headset to play audio through the headset. The interface may be further configured to connect to another mobile phone, for example, an AR device.

It can be understood that interface connection relationships between the modules that are described in this embodiment of this application are merely examples for description, and do not constitute any limitation on the structure of the mobile phone 200. In some other embodiments of this application, the mobile phone 200 may alternatively use an interface connection mode different from those in this embodiment or use a combination of a plurality of interface connection modes.

The charging management module 240 is configured to receive a charging input from the charger.

The power management module 241 is configured to connect to the battery 242, the charging management module 240, and the processor 210.

A wireless communication function of the mobile phone 200 may be implemented by using the antenna 1, the antenna 2, the mobile communication module 250, the wireless communication module 260, the modem processor, the baseband processor, and the like.

The antenna 1 and the antenna 2 are configured to transmit and receive electromagnetic wave signals. Each antenna in the mobile phone 200 may be configured to cover one or more communication frequency bands. Different antennas may be multiplexed to improve antenna utilization. For example, the antenna 1 may be multiplexed into a diversity antenna in a wireless local area network. In some other embodiments, an antenna may be used in combination with a tuning switch.

The mobile communication module 250 may provide wireless communication solutions, including 2G, 3G, 4G, 5G, and the like, applied to the mobile phone 200. The mobile communication module 250 may include at least one filter, a switch, a power amplifier, a low noise amplifier (LNA), and the like. The mobile communication module 250 may receive an electromagnetic wave through the antenna 1, perform filtering, amplification, and other processing on the received electromagnetic wave, and transmit a processed electromagnetic wave to the modem processor for demodulation. The mobile communication module 250 may further amplify a signal modulated by the modem processor, convert an amplified signal into an electromagnetic wave by using the antenna 1, and radiate the electromagnetic wave through the antenna 1. In some embodiments, at least some functional modules of the mobile communication module 250 may be disposed in the processor 210. In some embodiments, at least some functional modules of the mobile communication module 250 may be disposed in a same component as at least some modules of the processor 210.

The modem processor may include a modulator and a demodulator. The modulator is configured to modulate a to-be-sent low frequency baseband signal into a medium/high frequency signal. The demodulator is configured to demodulate a received electromagnetic wave signal into a low frequency baseband signal. Then, the demodulator transmits the low frequency baseband signal obtained through demodulation to the baseband processor for processing. After the low frequency baseband signal is processed by the baseband processor, a processed low frequency baseband signal is transmitted to the application processor. The application processor outputs a sound signal through an audio device (which is not limited to the loudspeaker 270A and the telephone receiver 270B), or displays an image or a video through the display screen 294. In some embodiments, the modem processor may be an independent component. In some other embodiments, the modem processor may be independent of the processor 210, and is disposed in a same component as the mobile communication module 250 or another functional module.

The wireless communication module 260 may provide wireless communication solutions applied to the mobile phone 200, including a wireless local area network (WLAN) (for example, wireless fidelity (Wi-Fi) network), Bluetooth (BT), a global navigation satellite system (GNSS), frequency modulation (FM), near field communication (NFC), and an infrared (IR) technology. The wireless communication module 260 may be one or more components integrated with at least one communication processing module. The wireless communication module 260 receives an electromagnetic wave through the antenna 2, performs frequency modulation and filtering processing on the electromagnetic wave signal, and sends a processed signal to the processor 210. The wireless communication module 260 may further receive a to-be-sent signal from the processor 210, perform frequency modulation and amplification on the signal, convert a processed signal into an electromagnetic wave by using the antenna 2, and radiate the electromagnetic wave through the antenna 2.

For example, in this embodiment of this application, the mobile phone 200 may establish a wireless connection to the peripheral device through the wireless communication module 260 by using a wireless communication technology (for example, Bluetooth). Based on the established wireless connection, the mobile phone 200 may send audio data to the peripheral device, and may further receive audio data from the peripheral device.

In some embodiments, in the mobile phone 200, the antenna 1 is coupled to the mobile communication module 250, and the antenna 2 is coupled to the wireless communication module 260, so that the mobile phone 200 can communicate with a network and another device by using a wireless communication technology. The wireless communication technology may include global system for mobile communications (GSM), general packet radio service (GPRS), code division multiple access (CDMA), wideband code division multiple access (WCDMA), time division-synchronous code division multiple access (TD-SCDMA), long term evolution (LTE), BT, GNSS, WLAN, NFC, FM, IR, and/or other technologies. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The mobile phone 200 implements a display function by using the GPU, the display screen 294, the application processor, and the like. The GPU is a microprocessor for image processing, and is connected to the display screen 294 and the application processor. The GPU is configured to perform mathematical and geometric calculation, and perform graphics rendering. The processor 210 may include one or more GPUs, and execute program instructions to generate or change display information.

The display screen 294 is configured to display an image, a video, and the like. In some embodiments, the mobile phone 200 may include two or N display screens 294, where N is a positive integer greater than 1.

The mobile phone 200 may implement a photographing function by using the ISP, the camera 293, the video codec, the GPU, the display screen 294, the application processor, and the like.

The ISP is configured to process data fed back by the camera 293.

The camera 293 is configured to capture a static image or a video. In some embodiments, the mobile phone 200 may include one or N cameras 293, where N is a positive integer greater than 1.

The digital signal processor is configured to process a digital signal, and may process other digital signals in addition to a digital image signal. For example, when the mobile phone 200 selects a frequency, the digital signal processor is configured to perform Fourier transform on frequency energy, and the like.

The video codec is configured to compress or decompress a digital video. The mobile phone 200 can support one or more types of video codecs. In this way, the mobile phone 200 may play or record videos in a plurality of encoding formats, for example, a moving picture experts group (MPEG)-1, MPEG-2, MPEG-3, and MPEG-4.

The NPU is a neural-network (NN) computing processor that rapidly processes input information by using a biological neural network structure, for example, by using a mode of transmission between human brain neurons, and may further perform continuous self-learning. Applications such as intelligent cognition of the mobile phone 200, for example, image recognition, facial recognition, voice recognition, and text understanding, can be implemented by using the NPU.

The external memory interface 220 may be configured to connect to an external memory card, for example, a micro SD card, to expand a storage capability of the mobile phone 200.

The internal memory 221 may be configured to store computer executable program code, where the executable program code includes instructions. The processor 210 runs the instructions stored in the internal memory 221, to implement various function applications and data processing of the mobile phone 200. For example, in this embodiment of this application, the processor 210 may execute the instructions stored in the internal memory 221, to establish a wireless pairing connection to each of two main bodies of the peripheral device through the wireless communication module 260, and perform short-range data exchange with the peripheral device, thereby implement functions such as calling and music playing through the peripheral device. The internal memory 221 may include a program storage area and a data storage area. The program storage area may store an operating system, an application program needed by at least one function (for example, a voice playing function or an image playing function), and the like. The data storage area may store data (for example, audio data and a phone book) created during use of the mobile phone 200, and the like. In addition, the internal memory 221 may include a high-speed random access memory, and may further include a non-volatile memory, for example, at least one magnetic disk storage device, a flash memory device, or a universal flash storage (UFS).

In this embodiment of this application, the mobile phone 200 may establish a wireless connection to each of the two main bodies of the peripheral device by using the wireless communication technology (for example, Bluetooth). For example, the mobile phone 200 first establishes a wireless connection to a first main body, and then establishes a wireless connection to a second main body through the first main body. After establishing the wireless connections, the mobile phone 200 may store a Bluetooth address of the peripheral device in the internal memory 221. In some embodiments, when the peripheral device is a device including two main bodies, for example, a TWS headset, left and right earbuds of the TWS headset have respective Bluetooth addresses. The mobile phone 200 may associatively store the Bluetooth addresses of the left and right earbuds of the TWS headset in the internal memory 221, so that the left and right earbuds of the TWS headset are used as a pair of devices.

The mobile phone 200 may implement an audio function, such as music playing and recording, by using the audio module 270, the loudspeaker 270A, the telephone receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to encode and decode audio signals. In some embodiments, the audio module 270 may be disposed in the processor 210, or some functional modules of the audio module 270 may be disposed in the processor 210.

The loudspeaker 270A, also referred to as a "speaker", is configured to convert an audio electrical signal into a sound signal. The mobile phone 200 may be used for listening to music or answering a hands-free call by using the loudspeaker 270A.

The telephone receiver 270B, also referred to as an "earpiece", is configured to convert an audio electrical signal into a sound signal. When a call is answered or voice information is received by using the mobile phone 200, the telephone receiver 270B may be put close to a human ear to listen to a voice.

The microphone 270C, also referred to as a "mic" or a "mike", is configured to convert a sound signal into an electrical signal. When making a call or sending voice information, a user may move a human mouth close to the microphone 270C and speak, to input a sound signal into the microphone 270C. The mobile phone 200 may be provided with at least one microphone 270C. In some other embodiments, the mobile phone 200 may be provided with two microphones 270C, which may further implement a noise reduction function in addition to sound signal collection. In some other embodiments, the mobile phone 200 may be alternatively provided with three, four, or more microphones 270C, to implement sound signal collection and noise reduction, and may further identify a sound source, to implement a directional recording function and the like.

The headset jack 270D is configured to connect to a wired headset. The headset jack 270D may be a USB interface 230, or may be a standard 3.5 mm open mobile terminal platform (OMTP) standard interface, or a cellular telecommunications industry association of the USA (CTIA) standard interface.

In this embodiment of this application, when the wireless connection is established between the mobile phone 200 and the peripheral device, for example, the TWS headset, the TWS headset may be used as an audio input/output device of the mobile phone 200. For example, the audio module 270 may receive an audio electrical signal transmitted by the wireless communication module 260, to implement functions such as answering a call and music playing by using the TWS headset. For example, in a process in which the user makes a call, the TWS headset may collect a sound signal of the user, convert the sound signal into an audio electrical signal, and send the audio electrical signal to the wireless communication module 260 of the mobile phone 200. The wireless communication module 260 transmits the audio electrical signal to the audio module 270. The audio module 270 may convert the received audio electrical signal into a digital audio signal, encode the digital audio signal, and then transmit an encoded digital audio signal to the mobile communication module 250. The mobile communication module 250 transmits the encoded digital audio signal to a peer device of a call, to implement the call. For another example, when the user plays music by using a media player of the mobile phone 200, the application processor may transmit an audio electrical signal corresponding to the music played by the media player to the audio module 270. The audio module 270 transmits the audio electrical signal to the wireless communication module 260. The wireless communication module 260 may send the audio electrical signal to the TWS headset, so that the TWS headset converts the audio electrical signal into a sound signal for playing.

The pressure sensor 280A is configured to sense a pressure signal, and may convert the pressure signal into an electrical signal. In some embodiments, the pressure sensor 280A may be disposed on the display screen 294. There are many types of pressure sensors 280A, for example, a resistive pressure sensor, an inductive pressure sensor, and a capacitive pressure sensor. The capacitive pressure sensor may include at least two parallel plates made of conductive materials. When force is exerted on the pressure sensor 280A, capacitance between electrodes changes. The mobile phone 200 determines a pressure strength based on a change of the capacitance. When a touch operation is performed on the display screen 294, the mobile phone 200 detects a touch operation intensity by using the pressure sensor 280A. The mobile phone 200 may also calculate a touch location based on a signal detected by the pressure sensor 280A. In some embodiments, touch operations that are exerted on a same touch location but have different touch operation intensities may correspond to different operation instructions. For example, when a touch operation with a touch operation intensity less than a first pressure threshold is exerted on an icon of an SMS message application, an instruction for viewing an SMS message is executed. When a touch operation with a touch operation intensity greater than or equal to the first pressure threshold is exerted on the icon of the SMS message application, an instruction for creating an SMS message is executed.

The gyroscope sensor 280B may be configured to determine a moving posture of the mobile phone 200.

The barometric pressure sensor 280C is configured to measure atmospheric pressure.

The magnetic sensor 280D includes a Hall effect sensor. The mobile phone 200 may detect opening/closing of a flip leather case by using the magnetic sensor 280D.

The acceleration sensor 280E may detect magnitude of accelerations of the mobile phone 200 in all directions (usually along three axes).

The distance sensor 280F is configured to measure a distance. The mobile phone 200 may measure a distance in an infrared or a laser manner. In some embodiments, in a photographing scenario, the mobile phone 200 may measure a distance by using the distance sensor 280F, to implement rapid focusing.

The optical proximity sensor 280G may include, for example, a light-emitting diode (LED) and an optical detector, such as a photodiode.

The ambient light sensor 280L is configured to sense ambient light brightness.

The fingerprint sensor 280H is configured to collect a fingerprint. By using a feature of the collected fingerprint, the mobile phone 200 may implement unlocking by using the fingerprint, access an application lock, take a photo by using the fingerprint, answer a call by using the fingerprint, and the like.

The temperature sensor 280J is configured to detect a temperature. In some embodiments, the mobile phone 200 executes a temperature processing policy by using the temperature detected by the temperature sensor 280J.

The touch sensor 280K is also referred to as a "touch panel". The touch sensor 280K may be disposed on the display screen 294. The touch sensor 280K and the display screen 294 form a touchscreen, which is also referred to as a "touch screen". The touch sensor 280K is configured to detect a touch operation performed on or near the touch sensor 280K. The touch sensor may transmit the detected touch operation to the application processor to determine a type of a touch event.

The bone conduction sensor 280M may obtain a vibration signal. In some embodiments, the bone conduction sensor 280M may obtain a vibration signal of a vibrating bone block of a vocal-cord part of a human body. The bone conduction sensor 280M may also be in contact with a pulse of the human body to receive blood pressure pulse signals. In some embodiments, the bone conduction sensor 280M may be alternatively disposed in the earbud, to combine into a bone conduction headset. The audio module 270 may obtain a voice signal by parsing the vibration signal of the vibrating bone block of the vocal-cord part obtained by the bone conduction sensor 280M, to implement a voice function.

The button 290 includes a power button, a volume button, and the like. The button 290 may be a mechanical button, or may be a touch key. The mobile phone 200 may receive a button input, and generate a button signal input related to a user setting and function control of the mobile phone 200.

The motor 291 may generate a vibration alert. The motor 291 may be configured to provide an incoming call vibration alert and a touch vibration feedback.

The indicator 292 may be an indicator light, may be configured to indicate a charging status and a battery level change, and may also be configured to indicate a message, a missed call, a notification, and the like.

The SIM card interface 295 is configured to connect to a SIM card.

In the following embodiments of this application, an example in which a connection is established between the mobile phone 200 and the TWS headset 100 in a Bluetooth manner is used to describe a pairing connection method provided in embodiments of this application.

The TWS headset may exchange audio data with the mobile phone by using a Bluetooth connection between the TWS headset and the mobile phone, where the audio data may include media data, voice data, and the like. For example, the TWS headset may play media data such as sound in music, recording, and video files for the user. In a phone call, audio call, or video call scenario, the TWS headset may play an incoming call alert tone and voice data of a peer end of a call, collect voice data of the user, and send the voice data of the user to the mobile phone. In a game scenario, the TWS headset may play background music, a game alert tone, voice data of a teammate, and the like, collect voice data of the user, and send the voice data of the user to the mobile phone. In a WeChat voice message scenario, the TWS headset may play a voice message, collect voice data recorded by the user, and send the recorded voice data to the mobile phone. In a voice assistant scenario or the like, the TWS headset may collect voice data of the user, and send the voice data of the user to the mobile phone.

A Bluetooth wireless technology is a short-range communication system intended to replace a cable connection between portable and/or fixed electronic devices. Key features of the Bluetooth wireless communication technology are stability, low energy, and low costs. Many features of a core specification of the Bluetooth wireless technology are optional and support product differentiation.

The Bluetooth wireless technology has two forms of systems: basic rate (BR) and low energy (LE). Both forms of systems include device discovery, connection establishment, and connection mechanisms. The base rate BR may include an optional enhanced data rate (EDR) and an alternate media access control and physical layer extension (AMP). The low energy LE system includes features designed to implement products that require lower power consumption, lower complexity, and lower costs than the BR/EDR.

Devices that implement the BR and LE systems can communicate with another device in which the two systems are also implemented. Some profiles and use cases are supported by only one of the systems. Therefore, the device in which the two systems are implemented is capable of supporting more use cases.

A profile is a unique concept of a Bluetooth protocol. To implement interworking between different devices on different platforms, the Bluetooth protocol specifies a core specification (referred to as a Bluetooth core), and defines various application layer (application) specifications for various different application scenarios. These application layer specifications are referred to as Bluetooth profiles. To implement interworking between different devices on different platforms, the Bluetooth protocol defines application layer specifications (profiles) for various possible and universal application scenarios, such as an advance audio distribution profile (A2DP), an audio/video remote control profile (AVRCP), a basic imaging profile (BIP), a hands-free profile (HFP), a human interface device profile (HID profile), a headset profile (HSP), a serial port profile (SPP), a file transport profile (FTP), and a personal area networking profile (PAN profile).

Figure 3A:
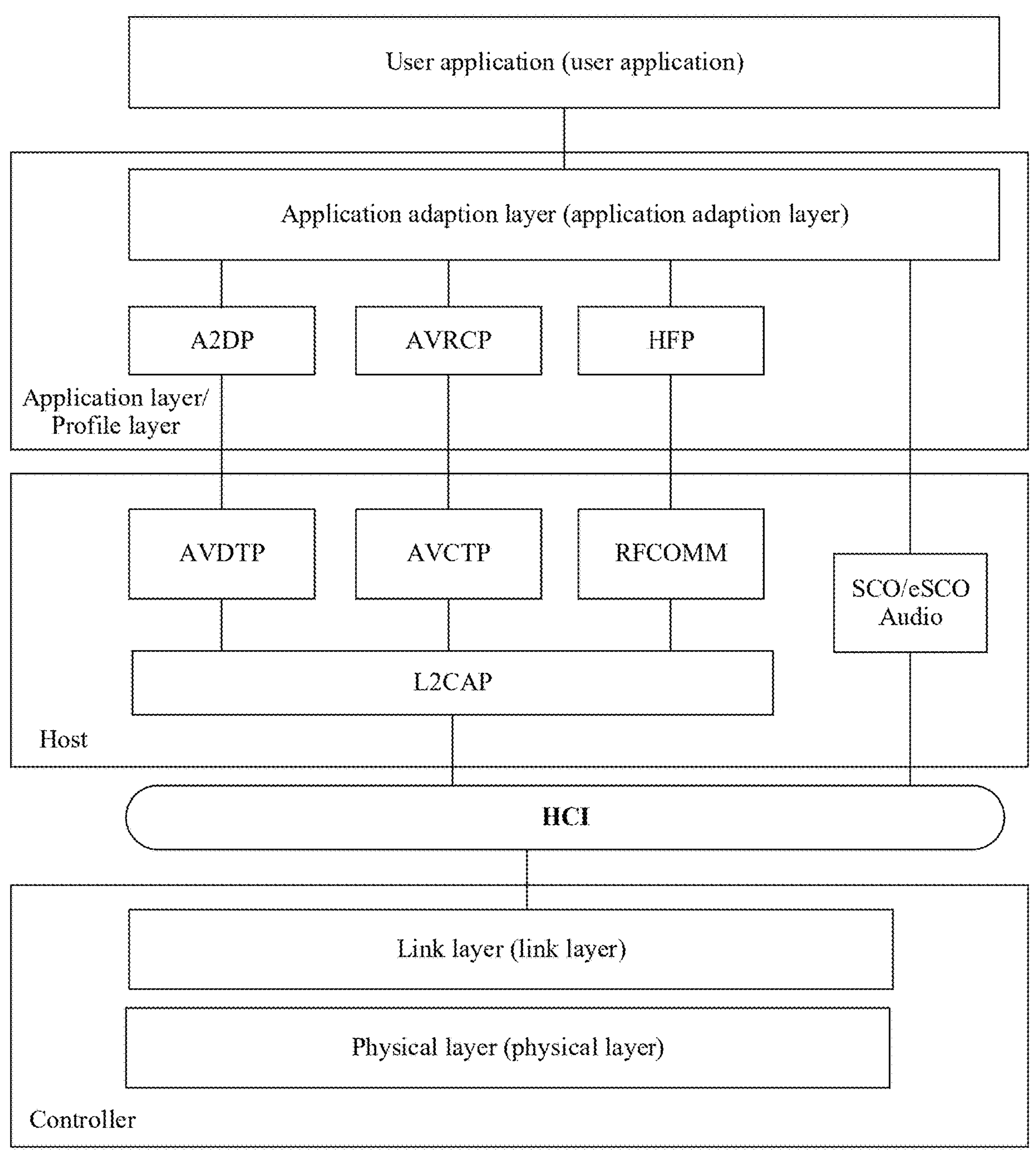
FIG. 3A is a schematic diagram of an existing BR/EDR Bluetooth protocol framework.

FIG. 3A shows an existing BR/EDR Bluetooth protocol framework. As shown in FIG. 3A, the existing BR/EDR Bluetooth protocol framework may include a plurality of profiles. For a simplified illustration, FIG. 3A shows only profiles of some audio applications: an A2DP, an AVRCP, and an HFP. This application is not limited thereto. The existing BR/EDR Bluetooth protocol framework may further include other profiles, such as an SPP and an FTP.

The A2DP specifies a protocol stack and a usage method for transmitting high-quality audio in a Bluetooth asynchronous transmission channel manner. For example, a stereo Bluetooth headset may be used to listen to music from a music player. The AVRCP supports a remote control function, and generally supports remote control operations such as pause, stop, replay, and volume control. For example, the Bluetooth headset may be used to perform operations such as pause and switching to a next song to control the music player to play music. The FHP is a voice application that provides a hands-free call function.

Figure 3B:
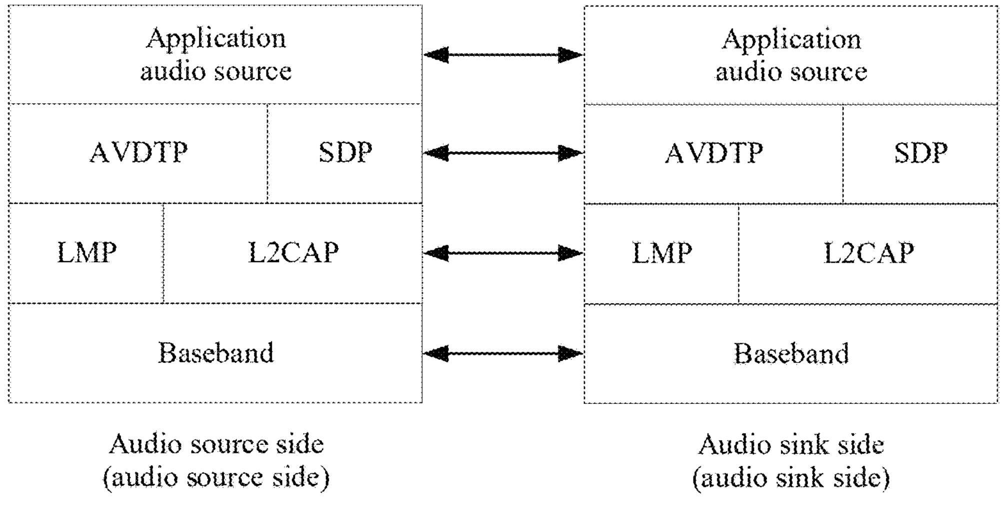
FIG. 3B and FIG. 3C are schematic diagrams of protocol stacks of several existing audio profiles.
Figure 3C:
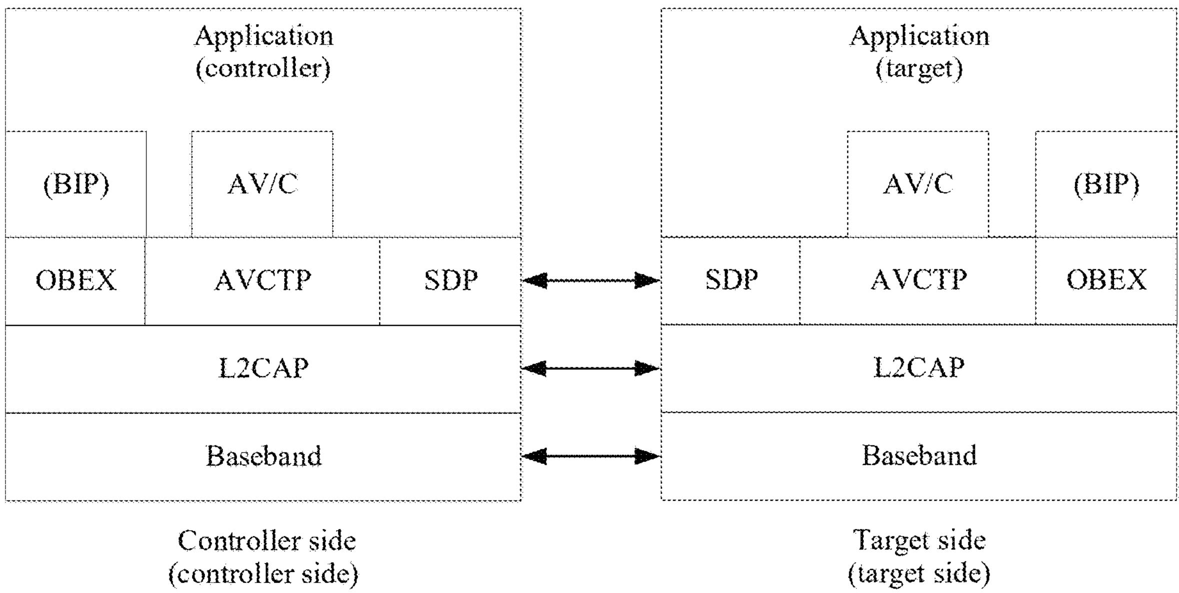

FIG. 3B and FIG. 3C respectively show protocol stacks of the A2DP and the HFP. Details are as follows.

A. Protocols and Entities Included in the A2DP Protocol Stack

An audio source is a source of a digital audio stream that is transmitted to an audio sink in a piconet. The audio sink is a receiving side that receives the digital audio stream from the audio source in the same piconet. In a music playing scenario, a typical device used as an audio source may be a media playing device, for example, an MP3, and a typical device used as an audio sink may be a headset. In a recording scenario, a typical device used as an audio source may be a sound collection device, for example, a microphone, and a typical device used as an audio sink may be a portable recorder.

A baseband, a link management protocol (LMP), a logical link control and adaptation protocol (L2CAP), and a service discovery protocol (SDP) are Bluetooth protocols defined in Bluetooth core specifications. An audio and video data transport protocol (AVDTP) includes a signaling entity for negotiation of streaming parameters and a transport entity that handles the streaming. An application layer is an entity in which application services and transmission service parameters are defined. The entity is also used to adapt audio stream data to a defined packet format or adapt a defined packet format to audio stream data.

B. Protocols and Entities Included in the AVRCP Protocol Stack

A controller is a device that initiates a transaction by sending a command frame to a target device. The typical controller may be a personal computer, a mobile phone, a remote control, or the like. A target is a device that receives the command frame and correspondingly generates a response frame. The typical target may be an audio playing/recording device, a video playing/recording device, a television, or the like.

A baseband, a link management protocol (LMP), and a logical link control and adaptation protocol (L2CAP) are layer 1 and layer 2 Bluetooth protocols of an OSI model. An audio/video control transport protocol (AVCTP) and the basic imaging profile (BIP) are defined to obtain a process and a message for controlling an A/V device. An SDP is a service discovery protocol of Bluetooth. An object exchange (OBEX) protocol is used to transmit data objects between Bluetooth devices, is derived from a protocol defined by the infrared, and is used by Bluetooth later. Audio and video/control (AV/C) is an entity responsible for device control signaling that is based on an AV/C command. An application layer is an ACRVP entity, and is used for exchanging control and browsing commands defined in the protocol.

C. Protocols and Entities Included in the HFP Protocol Stack

An audio gateway is a device used as a gateway for audio input and audio output. A typical device used as an audio gateway may be a cellular phone. A hands-free unit is a device used as a remote audio input and output mechanism of the audio gateway. The hands-free unit may provide some remote control methods. A typical device used as a hands-free unit may be an in-vehicle hands-free unit.

A baseband, a link management protocol (LMP), and a logical link control and adaptation protocol (L2CAP) are layer 1 and layer 2 Bluetooth protocols of an OSI model. RFCOMM is a Bluetooth serial port emulation entity. An SDP is a service discovery protocol of Bluetooth. Hands-free control is an entity responsible for a specific control signal of the hands-free unit. The control signal is based on an AT command. An audio port emulation layer is an entity of an analog audio port on the audio gateway. An audio driver is driver software in the hands-free unit.

It can be learned from the foregoing items A to C that the A2DP, the AVRCP, and the HFP correspond to different protocol stacks, and different profiles use different transmission links and are incompatible with each other. In other words, the profiles are in effect different protocol stacks that are of the Bluetooth protocols and that correspond to different application scenarios. When the Bluetooth protocols need to support a new application scenario, a profile and a protocol stack need to be added based on the existing Bluetooth protocol framework.

In addition, because different profiles use different protocol stacks and the protocol stacks are independent of each other, switching between applications of different profiles is time-consuming and an obvious pause occurs.

For example, when a user wearing a Bluetooth headset is playing a game (the game generates a game background sound, for example, a game skill-triggered sound), the user turns on a microphone and communicates with a teammate. In this scenario, audio transmission needs to be switched from the A2DP to the HFP. The background sound transmission during the game may be implemented based on the A2DP protocol stack, and voice transmission during the communication with the teammate may be implemented based on the HFP protocol stack. The game background sound requires higher voice quality than the voice. To be specific, a codec parameter (for example, a compression ratio) used by the game background sound is different from that used by the voice, and the game background sound uses a higher compression ratio than the voice. Because the A2DP and the HFP are independent of each other, for switching from the A2DP to the HFP, a configuration related to the game background sound transmission corresponding to the A2DP needs to be stopped, and operations such as parameter negotiation and configuration initialization for audio data transmission corresponding to the HFP need to be performed. The switching process takes a long time, resulting in a pause that can be obviously perceived by the user.

In addition, point-to-multipoint synchronous transmission is not implemented in the existing BR/EDR Bluetooth protocol.

The existing BR/EDR Bluetooth protocol defines two Bluetooth physical links: an asynchronous connectionless (ACL) link, and a synchronous connection oriented (SCO) or extended SCO (eSCO) link. The ACL link supports both symmetric (point-to-point) connections and asymmetric (point-to-multipoint) connections. For the ACL link, transmission efficiency is high, but a delay is uncontrollable, and a quantity of retransmission times is not limited. The ACL link may be mainly used to transmit delay-insensitive data, such as control signaling and packet data. The SCO/eSCO link supports symmetric (point-to-point) connections. For the SCO/eSCO link, transmission efficiency is low, but a delay is controllable, and a quantity of retransmission times is limited. The SCO/eSCO link may be mainly used to transmit delay-sensitive services (such as a voice service).

In the existing BR/EDR Bluetooth protocol, the two links, namely, the ACL link and the SCO/eSCO link, do not support isochronous data. In other words, in a point-to-multipoint piconet, data sent by a master device to a plurality of slave devices is not synchronously transmitted, and signals of the plurality of slave devices are not synchronized.

An existing BLE protocol supports a point-to-multipoint network topology structure. In addition, the Bluetooth Special Interest Group (SIG) has proposed to support isochronous data in the BLE, to allow a BLE device to transmit isochronous data. The isochronous data is time-bounded. The isochronous data refers to information in a stream. Each information entity in the stream is restricted by time relationships between the information entity and a previous entity, and between the information entity and a subsequent entity.

Figure 4:
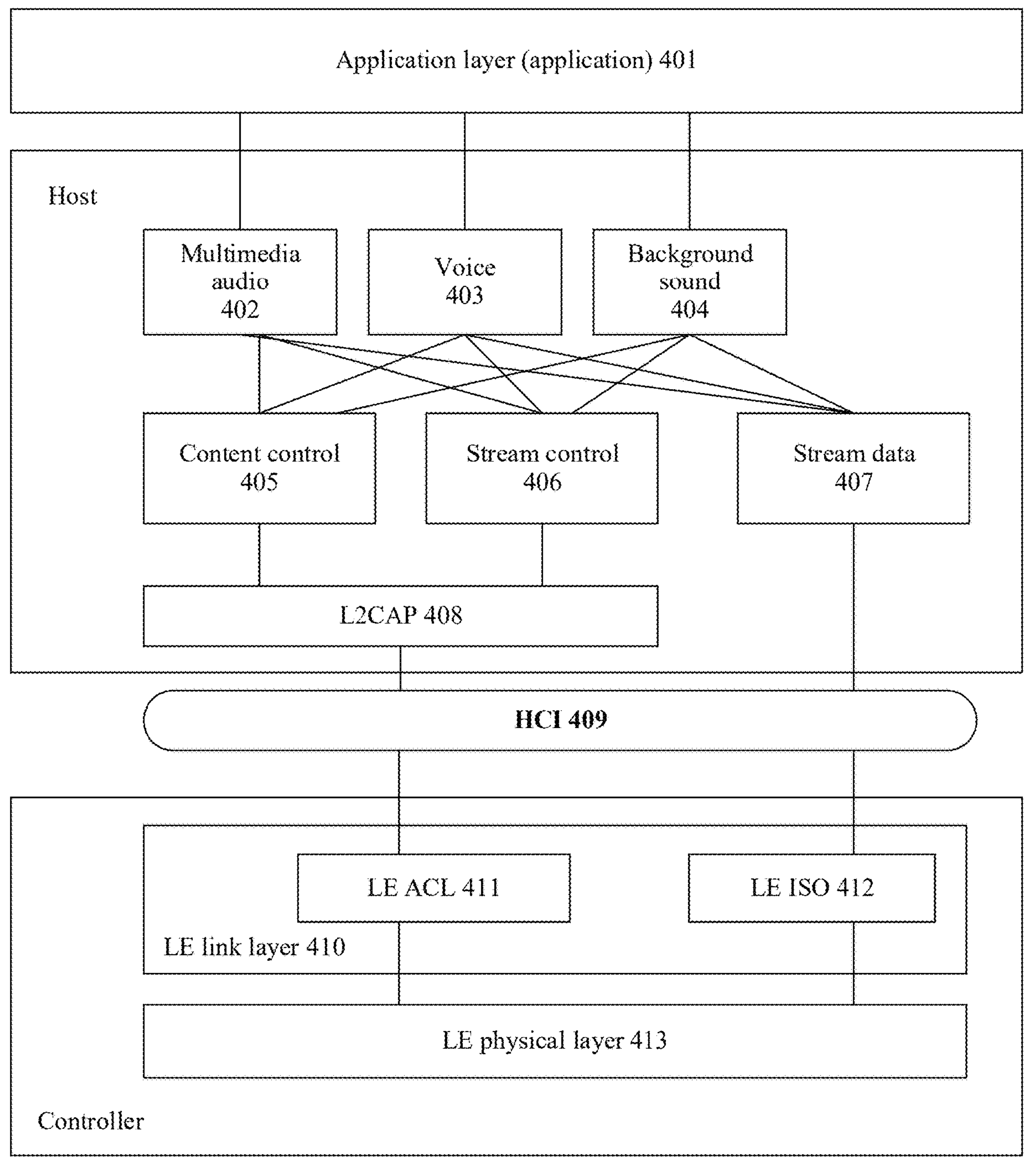
FIG. 4 is a schematic diagram of a BLE-based audio protocol framework according to this application.

FIG. 4 shows a BLE-based audio protocol framework according to this application. As shown in FIG. 4, the protocol framework may include an LE physical layer 413, an LE link layer 410, an L2CAP layer, and an application layer 408. The LE physical layer 413 and the LE link layer 410 may be implemented in a controller, and the L2CAP layer 408 may be implemented in a host. The protocol framework may further include some functional entities implemented in the host: a multimedia audio functional entity 402, a voice functional entity 403, a background sound functional entity 404, a content control functional entity 405, a stream control functional entity 406, and a stream data functional entity 407.

In the controller, details are as follows:

(1) The LE physical layer 413 may be responsible for providing a physical channel (usually referred to as a channel) for data transmission. Generally, a communication system includes several different types of channels such as a control channel, a data channel, and a voice channel. Bluetooth uses a 2.4 GHz industrial scientific medical (ISM) frequency band.

(2) The LE link layer 410 provides a physical-independent logical transmission channel (also referred to as a logical link) between two or more devices on the basis of the physical layer. The LE link layer 410 may be used to control a radio frequency status of a device. The device is in one of five states: waiting, advertising, scanning, initializing, and connecting. An advertising device may send data without establishing a connection, and a scanning device receives the data sent by the advertising device. A device initiating a connection responds to the advertising device by sending a connection request. If the advertising device accepts the connection request, the advertising device and the device initiating the connection enter a connecting state. The device initiating the connection is referred to as a master device, and the device accepting the connection request is referred to as a slave device.

The LE link layer 410 may include an LE ACL link 411 and an LE isochronous (ISO) link 412. The LE ACL link 411 may be used to transmit control messages between devices, for example, a stream control message, a content control message, and a volume control message. The LE ISO link 412 may be used to transmit isochronous data (for example, stream data) between devices.

In the host, details are as follows:

(1) The L2CAP layer 408 may be responsible for managing logical links provided by the logical layer. Based on the L2CAP, different upper-layer applications can share a same logical link. This is similar to a concept of a port in a TCP/IP.

(2) The multimedia audio functional entity 402, the voice functional entity 403, and the background sound functional entity 404 may be functional entities configured based on service scenarios, and may be used to classify audio applications at the application layer into several audio services such as multimedia audio, voice, and background sound audio services. The audio services are not limited to the multimedia audio, voice, and background sound audio services. The audio services may be alternatively classified into voice, music, game, video, voice assistant, email alert tone, alarm, alert tone, navigation tone, and the like.

(3) The content control functional entity 405 may be responsible for encapsulating content control (for example, playing a previous song and a next song) messages of various audio services, and transmits encapsulated content control messages through the LE ACL link 411.

(4) The stream control functional entity 406 may be responsible for parameter negotiation, such as negotiation of quality of service (QoS) parameters, negotiation of codec parameters, negotiation of isochronous data path parameters (referred to as ISO parameters for short below), and may be responsible for establishment of an isochronous data path.

(5) The stream data functional entity 407 may be responsible for transmitting audio data over the isochronous data path. The isochronous data path may be based on a connected isochronous audio stream (CIS). The CIS may be used to transmit isochronous data between devices in a connecting state. The isochronous data path is ultimately carried on the LE ISO 412. The stream control functional entity 406 may be further used to perform negotiation on parameters before establishing the isochronous data path, and then establish the isochronous data path based on the negotiated parameters.

As shown in FIG. 4, in the BLE-based audio protocol framework provided in this application, audio data from the application layer is finally transmitted over the LE ISO link 412.

In addition, the audio protocol framework shown in FIG. 4 may further include a host controller interface (HCI). The host and the controller communicate with each other through the HCI by using an HCI command as a communication medium. The host may be implemented in an application processor (AP) of a device, and the controller may be implemented in a Bluetooth chip of the device. Alternatively, in a small-sized device, the host and the controller may be implemented in one processor or controller, and the HCI is optional in this case.

Figures 5, 6:
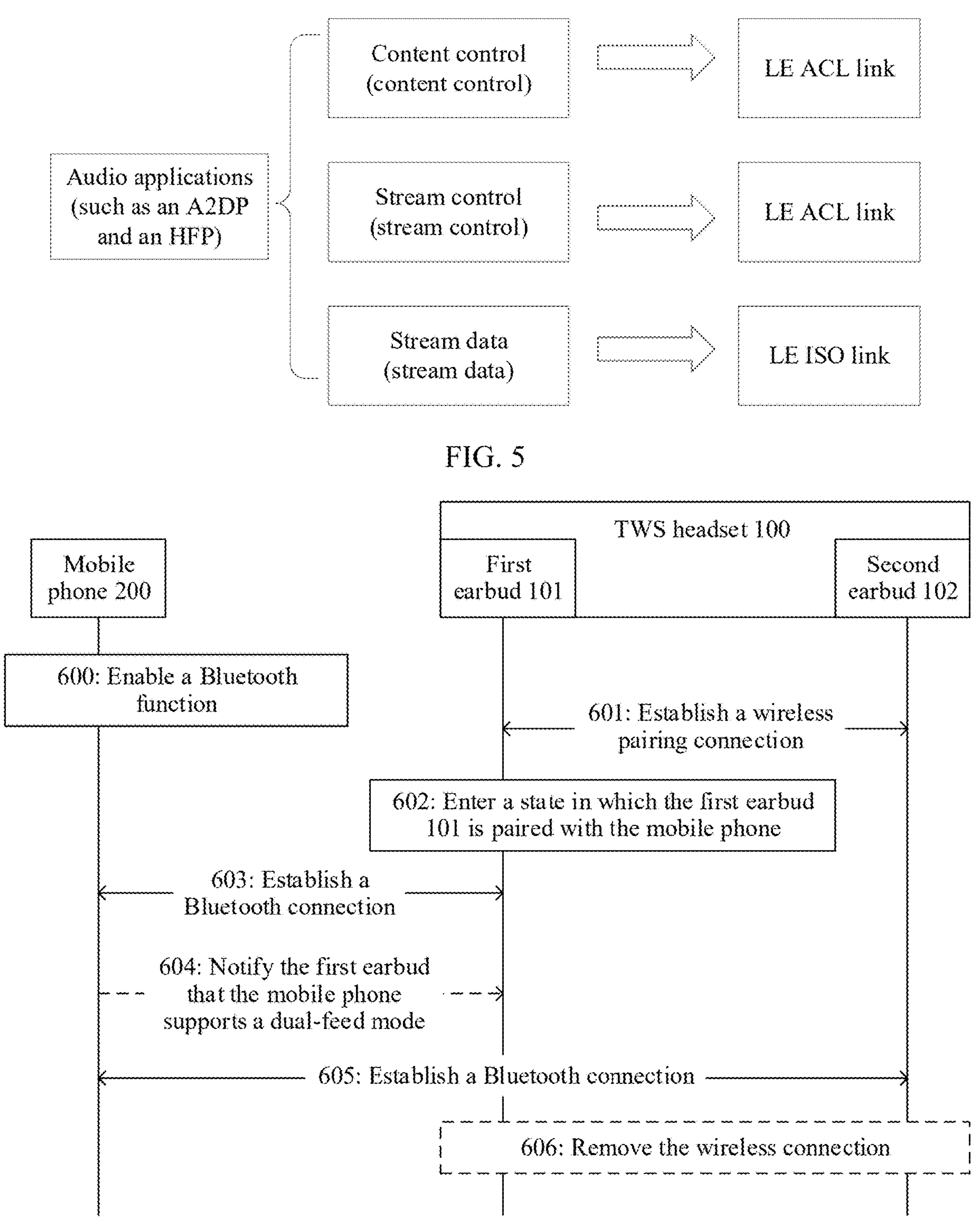
FIG. 5 is a schematic diagram of several data types of audio services according to this application.
FIG. 6 is a schematic flowchart of establishing a Bluetooth connection between a mobile phone and a TWS headset.

As shown in FIG. 5, in the BLE-based audio protocol framework provided in this application, data of various audio applications (such as an A2DP and an HFP) may be classified into three types:

1. content control data: call control (for example, answering and ending a call) signaling, playing control (for example, playing a previous song and a next song) signaling, volume control (for example, increasing and decreasing a volume) signaling, and other signaling;
2. stream control data: signaling used for managing streams, for example, a create stream and a terminate stream, where the stream may be used to carry audio data; and 3. stream data: audio data.

The content control data and the stream control data are transmitted over the LE ACL link 411, and the stream data is transmitted over the LE ISO link 412.

In the existing Bluetooth protocols, different profiles correspond to different protocol stacks, and are corresponding to different transmission frameworks. For example, the A2DP and the HFP correspond to different transmission frameworks. A2DP stream data (for example, stereo music data) is finally transmitted over an ACL link, because transmission efficiency of the ACL link is high. HFP stream data (for example, voice data) is finally transmitted over an SCO/eSCO link, because a transmission delay of the SCO/eSCO link is controllable.

It can be learned that the BLE-based audio protocol framework provided in this application supports audio transmission and may unify service-level connections, and all upper-layer audio profiles are classified into the audio services such as the multimedia audio, voice, and background sound audio services based on the service scenarios. The stream control functional entity in the protocol stack is responsible for stream control of various audio services (including negotiation of QoS parameters, negotiation of codec parameters, negotiation of ISO parameters, and establishment of an isochronous data path). The content control functional entity in the protocol stack is responsible for content control of various audio services (for example, call control such as answering and ending a call, playing control such as playing a previous song and a next song, and volume control). The stream control message and the content control message are transmitted over the LE ACL link, and the stream data is transmitted over the LE ISO link. In this way, different audio profiles can be based on a same transmission framework, and compatibility is better.

In the following embodiments of this application, an example is used for description in which a connection is established between a mobile phone and a TWS headset in an audio playing scenario, to play audio for a user. As shown in FIG. 6, a connection method may include the following operations.

Operation 600: Enable a Bluetooth function of the mobile phone.

Figure 7:
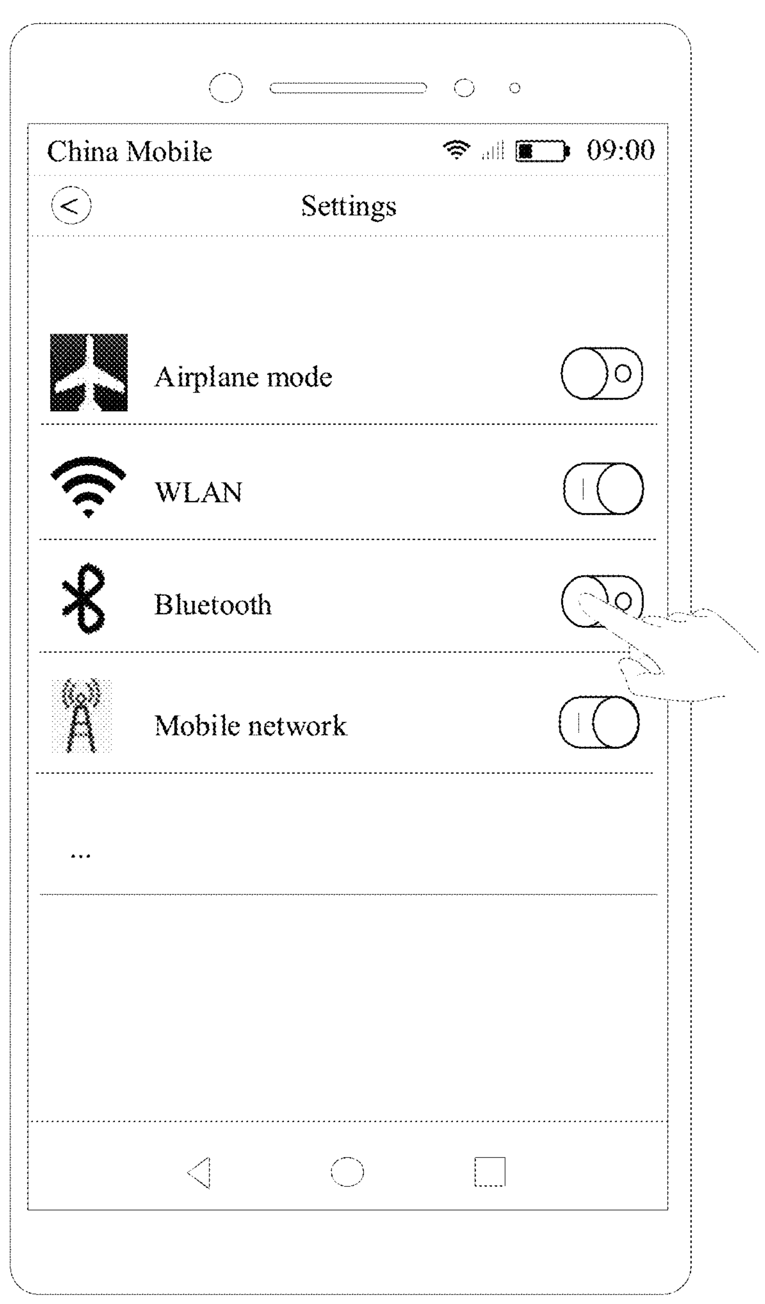
FIG. 7 is a schematic diagram of a user interface on which a user enables a Bluetooth function on a mobile phone.

When a user wants to use the TWS headset to play audio, for example, as shown in FIG. 7, the user may enable the Bluetooth function of the mobile phone.

Operation 601: A first earbud 101 and a second earbud 102 of the TWS headset establish a wireless pairing connection.

For example, in one case, the first earbud 101 and the second earbud 102 are placed in a headset storage box 103. When the headset box is opened, or after one earbud is taken out of the storage box 103 of the mobile phone, or after the user touches (for example, light-touches, clicks, or touches and holds) a button 104 on the headset storage box 103, the first earbud 101 and the second earbud 102 may establish a Bluetooth pairing connection in a BLE manner or a BR/EDR manner. When the BLE manner is used, the first earbud 101 and the second earbud 102 may discover each other through BLE advertising, and establish a Bluetooth pairing connection by using a BLE connectable advertising message. When the BR/EDR manner is used, the first earbud 101 and the second earbud 102 may discover each other in a page scan or inquiry scan manner, and establish a Bluetooth pairing connection by using a page message, a page response message, and the like.

In some embodiments, if the first earbud 101 and the second earbud 102 have been paired with each other by a manufacturer in advance or have been paired with each other before being used this time, the first earbud 101 and the second earbud 102 each may have stored a MAC address of the other party. When the headset storage box 103 is opened, or after the user touches a button 104, or after one of the first earbud 101 and the second earbud 102 is taken out of the headset storage box 103, the first earbud 101 and the second earbud 102 each may perform paging based on the stored MAC address of the other party, to establish a Bluetooth connection.

If the first earbud 101 and the second earbud 102 have been paired with each other, after the first earbud 101 and the second earbud 102 are placed in the headset storage box 103, an indicator light 129 on the headset storage box 103 is on. If the indicator light 129 is off, it indicates that the first earbud 101 and the second earbud 102 have not been paired with each other. In this case, the user may touch another control (not shown in FIG. 1) on the headset storage box 103 or touch and hold the button 104, to indicate the first earbud 101 and the second earbud 102 each to clear the stored MAC address of the other party. Then, the first earbud 101 and the second earbud 102 may establish a Bluetooth connection to each other through scanning.

In some embodiments, because wireless communication technologies such as Bluetooth and Wi-Fi all use a frequency band of 2.4 GHz, if the first earbud 101 and the second earbud 02 that have established the Bluetooth pairing connection support NFMI, the first earbud 101 and the second earbud 102 may switch to an NFMI connection (which does not use the frequency band of 2.4 GHz), to reduce interference during data transmission performed in the frequency band of 2.4 GHz. In addition, the first earbud 101 and the second earbud 102 may alternatively establish a wireless pairing connection through another near field communication technology, for example, Wi-Fi. This is not limited in this embodiment of this application.

It should be noted that after the first earbud 101 and the second earbud 102 establish the wireless connection, the first earbud 101 and the second earbud 102 each may store the MAC address of the other party, to indicate that the first earbud 101 and the second earbud 102 are used in pairs as a group/pair of devices. Alternatively, the first earbud 101 and the second earbud 102 may correspond to a same identity, to indicate that the first earbud 101 and the second earbud 102 are used in cooperation as a pair of devices. For example, the first earbud 101 and the second earbud 102 may synchronously play a left channel signal and a right channel signal of same audio data. The identity may be an identifier (for example, the MAC address of the first earbud 101) negotiated between the first earbud 101 and the second earbud 102, may be an identifier set by the mobile phone 200 after the first earbud 101 and the second earbud 102 are connected to the mobile phone 200, or may be a preset identifier. This is not limited in this application.

After the first earbud 101 and the second earbud 102 establish the wireless pairing connection, the first earbud 101 and/or the second earbud 102 may notify the user that the connection has been established between the TWS earbuds. Alternatively, the first earbud 101 and/or the second earbud 102 notifies, by keeping the indicator light steady on, blinking, or in a specific color, the user that the connection has been established between the TWS earbuds. Alternatively, the first earbud 101 and/or the second earbud 102 notifies, by displaying information such as a text or an icon on a display screen, the user that the connection has been established between the TWS earbuds.

After the first earbud 101 and the second earbud 102 establish the wireless pairing connection, the first earbud 101 may enter a connectable discoverable state, so that the first earbud 101 can be discovered by the mobile phone 200 and connected to the mobile phone 200. The second earbud 102 may enter a non-connectable undiscoverable state. The second earbud 102 in the non-connectable undiscoverable state cannot be detected by another device through Bluetooth, and cannot establish a Bluetooth connection to another device.

Operation 602: The first earbud 101 enters a state in which the first earbud 101 is paired with the mobile phone.

Before the TWS headset and the mobile phone 200 establish a Bluetooth pairing connection, the first earbud 101 needs to first enter the state in which the first earbud 101 is paired with the mobile phone 200. The second earbud 102 may alternatively function as the first earbud 101.

In some embodiments, the TWS headset may include a primary earbud and a secondary earbud, the first earbud 101 may be the primary earbud or the secondary earbud, and the second earbud 102 may be the secondary earbud or the primary earbud. The mobile phone 200 may first establish a Bluetooth connection to the primary earbud.

There may be many manners for distinguishing between the primary earbud and the secondary earbud. For example, it is considered by default that a right earbud of the TWS headset is the primary earbud, and a left earbud of the TWS headset is the secondary earbud. For another example, an earbud that is taken out of the headset storage box 103 first is the primary earbud, and an earbud that is taken out of the headset storage box 103 subsequently is the secondary earbud. For another example, an earbud that is placed in an ear first is the primary earbud, and an earbud that is placed in an ear subsequently is the secondary earbud. For another example, an earbud with a larger quantity of electricity in the TWS headset is the primary earbud, and an earbud with a smaller quantity of electricity in the TWS headset is the secondary earbud. For another example, a primary earbud used last time is considered by default as a primary earbud used this time. It should be noted that in a process in which the user uses the TWS headset, the primary and secondary earbuds may be switched between each other.

When the user performs a pairing connection between the TWS headset and the current mobile phone 200, if the user has established a pairing relationship between the TWS headset and another electronic device and the pairing relationship between the TWS headset and the another electronic device has not been canceled (for example, the TWS headset has stored a history of pairing between the TWS headset and the another mobile phone, such as a MAC address of the another mobile phone), the TWS headset can enter a paired state after canceling the pairing relationship with the another electronic device. For example, when detecting that the user touches and holds a pairing key (which may be, for example, a touch key 111) on the TWS headset, the TWS headset may cancel the pairing relationship between the TWS headset and the another electronic device. For another example, before the TWS headset is taken out of the headset storage box 103, the user may touch and hold the button 104 on the headset storage box 103, and the headset storage box 103 may trigger the TWS headset to cancel the pairing relationship between the TWS headset and the another electronic device. After canceling the pairing relationship between the TWS headset and the another electronic device, the first earbud 101 and the second earbud 102 enter a pairable state.

If the user has not paired the TWS headset with another electronic device before, the TWS headset may automatically enter a paired state.

Operation 603: The mobile phone 200 and the first earbud 101 establish a Bluetooth connection.

After the first earbud 101 enters the state in which the first earbud 101 is paired with the mobile phone 200, the first earbud 100 and the mobile phone 200 each may confirm, by using one or more interaction processes, whether the other party supports a dual-feed mode, and exchange a Bluetooth address (for example, a MAC address) of the other party. The mobile phone 200 may establish the Bluetooth connection to the first earbud 101 based on a capability of the mobile phone 200. For example, if both the mobile phone 200 and the first earbud 101 support the dual-feed mode, the following operations in this embodiment of this application may be performed, to establish a dual-feed connection between the mobile phone 200 and the TWS headset. If the mobile phone 200 does not support the dual-feed mode, a connection procedure of a listening, forwarding, or NFMI solution, or the like may be performed.

In a process of establishing the dual-feed connection between the mobile phone 200 and the TWS headset, the first earbud 101 and the mobile phone 200 each may first confirm that the other party supports the dual-feed mode, and then they establish the Bluetooth connection; or the first earbud 101 and the mobile phone 200 may first establish the Bluetooth connection, and then each of them confirms that the other party supports the dual-feed mode.

Figure 8:
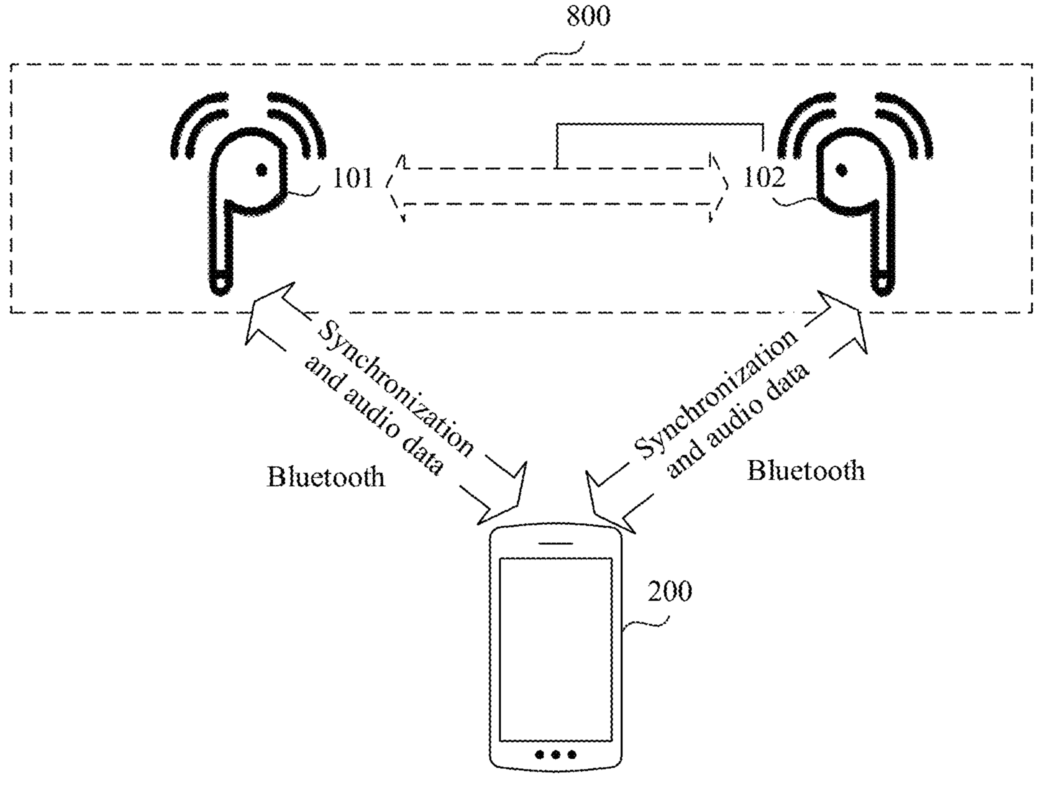
FIG. 8 is a schematic diagram of a system architecture for mutual communication between a TWS headset and a mobile phone.

In the pairing connection method provided in this embodiment of this application, as shown in FIG. 8, the mobile phone 200 may establish a Bluetooth connection to each of the TWS earbuds that are used in pairs, and simultaneously maintain the two Bluetooth connections. In this way, the mobile phone 200 exchanges audio data, service control data, synchronization data, and the like with each TWS earbud, to implement operations such as audio data playing and service action control. Therefore, this connection mode may be referred to as a dual-feed mode. After the connection in the dual-feed mode is established between the mobile phone 200 and the TWS headset, the wireless connection between the two TWS earbuds may be maintained, or the wireless connection may be removed. The two TWS earbuds can receive same audio data. Alternatively, the mobile phone 200 sends left channel audio data to the first earbud 101, and sends right channel audio data to the second earbud 102, so that the two earbuds play different channels of audio data.

Operation 604: The mobile phone 200 notifies the first earbud 101 that the mobile phone 200 supports the dual-feed mode.

If the mobile phone 200 supports the dual-feed mode, the mobile phone 200 may notify the first earbud 101, so that the first earbud 101 can perform a dual-feed connection procedure. It can be understood that in the process of establishing the Bluetooth connection in operation 603, if the mobile phone 200 has notified the first earbud 101 that the mobile phone 200 supports the dual-feed mode, operation 604 may not be needed. It can be understood that the mobile phone 200 may also notify the second earbud 102 that the mobile phone 200 supports the dual-feed mode.

Operation 605: The mobile phone 200 and the second earbud 102 establish the Bluetooth connection.

After determining that the mobile phone 200 also supports the dual-feed mode, the first earbud 101 may perform the dual-feed connection procedure. The first earbud 101 may send information about the second earbud 102 (for example, the MAC address of the second earbud 102) to the mobile phone 200, and send information about the mobile phone 200 (for example, the MAC address of the mobile phone) to the second earbud 102, so that the mobile phone 200 and the second earbud 102 can establish the Bluetooth connection by using the first earbud 101. It can be understood that the mobile phone 200 may alternatively establish the Bluetooth connection to the first earbud 101.

For example, in some embodiments, operation 605 may include: The first earbud 101 may send a connection message to the second earbud 102, where the connection message may include the MAC address of the mobile phone 200, and indicate the second earbud 102 to enter a connectable discoverable state. Indicating the second earbud 102 to enter the connectable discoverable state may be implemented by content in the connection information other than the MAC address of the mobile phone 200, for example, a specific identifier; may be implemented by carrying a specific message or a message type of the connection information; or may be implemented by the MAC address of the mobile phone 200, for the reason that the second earbud 102 has the Bluetooth address of the first earbud 101, and after receiving another MAC address sent by the first earbud 101, the second earbud 102 can identify the another MAC address, and then enters the connectable discoverable state and is connected to the mobile phone 200. The second earbud 102 may establish the Bluetooth connection to the mobile phone 200 based on the connection information, and the mobile phone 200 maintains the Bluetooth connection to the first earbud 101. After the second earbud 102 establishes the Bluetooth connection to the mobile phone 200, because the first earbud 101 has established the Bluetooth connection to the mobile phone 200 before, the dual-feed connection between the mobile phone 200 and the two earbuds of the TWS headset is implemented.

The connection information may further include link information such as a frequency hopping manner and clock information negotiated between the mobile phone 200 and the first earbud 101, so that the second earbud can establish a link based on the link information negotiated between the mobile phone 200 and the first earbud 101, and keep the established link synchronous with a link between the mobile phone 200 and the first earbud 101. In this way, the first earbud 101 and the second earbud 102 can play stereo music.

When a BR/EDR connection is established between the first earbud 101 and the second earbud 102, the first earbud 101 may send the connection information to the second earbud 102 according to an SPP protocol. When a BLE connection is established between the first earbud 101 and the second earbud 102, the first earbud 101 may send the connection message to the second earbud 102 according to a GATT protocol.

Operation 606: Remove the wireless connection between the first earbud 101 and the second earbud 102.

After the dual-feed connection is established, the mobile phone 200 may send audio data both to the first earbud 101 and the second earbud 102, and the first earbud 101 and the second earbud 102 synchronously play audio signals of corresponding channels. For example, the user may use the first earbud 101 and the second earbud 102 to play music. It can be understood that in some embodiments, the TWS headset uses dual-mode Bluetooth, and the dual-mode Bluetooth supports Bluetooth BR/EDR and BLE. In a dual-mode device, two Bluetooth solutions may be implemented by using a same radio frequency front-end and antenna.

In a BLE protocol, protocols are related to advertising communication are as follows: A link layer (LL), which is located at a bottommost layer and is responsible for defining and implementing advertising communication related functions, including selection of physical channels, definition of related link statuses, definition of PDUs, and the like; and a host controller interface (HCL) layer, which is responsible for abstracting all functions provided by the LL in forms of commands/events for a host to use. A BLE device participating in advertising communication may send different types of data packets (PDUs), and may determine statuses of the BLE device in advertising communication based on different types of sent PDUs. The statuses of the BLE device may include an advertising state, a scanning state, and an initiating state. The advertising state indicates a data sending side that periodically sends advertising data. The scanning state indicates a data receiving side that scans and receives advertising data. The initiating state indicates a connection initiating side that scans advertising data with a "connectable" flag. If the flag is found through scanning, a connection request is initiated. The BLE device in different statuses may send different types of PDUs.

In the advertising state, the following types of PDUs may be sent: ADV_IND (common advertising that can carry advertising data of no more than 31 bytes, and the BLE device in this state can be connected and scanned), ADV_DIRECT_IND (which is used for a point-to-point connection with Bluetooth addresses of both parties known and cannot carry advertising data, and the BLE device in this state can be connected by a specified device but cannot be scanned), ADV_NONCONN_IND (which is similar to ADV_IND, but the BLE device in this state cannot be connected or scanned), and ADV_SCAN_IND (which is similar to ADV_IND, but the BLE device in this state cannot be connected and can be scanned).

In the scanning state, the following types of PDUs may be sent: SCAN REQ (when advertising data of the ADV_IND or ADV_SCAN_IND type is received, the PDU may be used to request an advertiser to advertise more information) and SCAN RSP (after receiving the SCAN REQ request, the advertiser sends more data to a recipient by using the PDU response).

In the initiating state, the following types of PDUs may be sent: CONNECT_REQ (when advertising data of the ADV_IND or ADV_DIRECT_IND type is received, the PDU may be used to request to establish a connection to the other party).

In the advertising state, three physical channels are selected as physical channels for advertising communication in the BLE protocol. The selected physical channels are listed in Table 1:

TABLE 1

| RF Channel | RF Center Frequency | Advertising Channel Index |
|---|---|---|
| 0 | 2402 MHz | 37 |
| 12 | 2426 MHz | 38 |
| 39 | 2480 MHz | 39 |

At the LL layer, the host is allowed to select any one or more of the three physical channels in the foregoing table for advertising. The LL layer sends same advertising data once over each channel.

Figure 9:
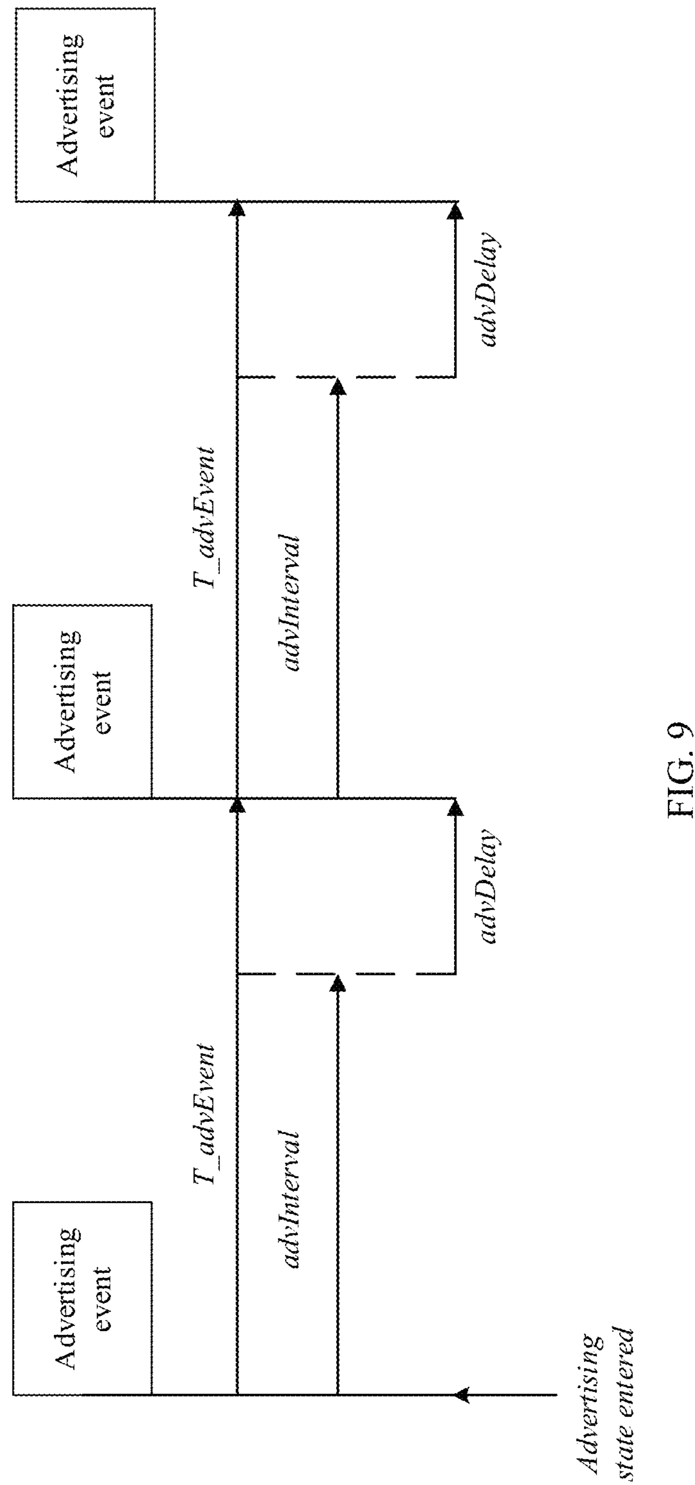
FIG. 9 is a schematic composition diagram of advertising in a Bluetooth protocol according to this application.

The BLE protocol contains an advertising event, which is a combination of advertising PDUs sent over all physical channels used. The BLE device is in the advertising state to advertise four types of data. The BLE device can advertise data over a maximum of three physical channels, that is, same data needs to be sequentially advertised over a plurality of physical channels. Therefore, a process of sequentially advertising data over the plurality of physical channels is referred to as an advertising event. In addition, after some advertising is sent, a receive end is allowed to respond to a request on a corresponding physical channel. After receiving the scan request, an advertiser needs to respond to the scan request over the same physical channel. These interaction processes are also calculated as an advertising event. Advertising events have different types: a connectable undirected event, a connectable directed event, a scannable undirected event, and a non-connectable undirected event. The connectable directed event includes a low duty cycle connectable directed event and a high duty cycle connectable directed event. For advertising events other than the high duty cycle connectable directed event, an advertising period is mainly determined by two parameters: advinterval and advDelay. As shown in FIG. 9, advinterval is a parameter that can be set by the host. For two advertising events, namely, the scannable undirected event and the non-connectable undirected event, a value of advinterval cannot be less than 100 ms. For two advertising events, namely, the connectable undirected event and the low duty cycle connectable directed event, a value of advinterval cannot be less than 20 ms. advDelay is a pseudo-random number ranging from 0 ms to 10 ms. A period of the high duty cycle connectable directed event is not controlled by the foregoing parameter, and may be at least 3.75 ms. However, according to the BLE protocol, the LL layer needs to exit the state within 1.28 s.

The scanning state is determined by two parameters: scanWindow and scanInterval. scanWindow indicates a time for performing scanning once, and scanInterval indicates an interval between two scans. If values of the two parameters are equal to each other, it indicates that scanning is performed continuously. According to the BLE protocol, maximum values of scanWindow and scanInterval cannot exceed 10.24 s, and the value of scanWindow cannot be greater than that of scanInterval.

The scanning state is classified into a passive scanning state and an active scanning state. In the passive scanning state, the BLE device only receives PDUs of the ADV_DIRECT_IND, ADV_IND, ADV_SCAN_IND, and ADV_NONCONN_IND types but does not send SCAN REQ. In the active scanning state, the BLE device receives the PDUs and sends SCAN REQ, and receives subsequent SCAN RSP.

The initiating state is similar to the scanning state. In the initiating state, the BLE device receives only two types of messages: ADV_DIRECT_IND and ADV_IND. When conditions are satisfied, CONNECT_REQ is sent to request connection establishment.

Figure 10:
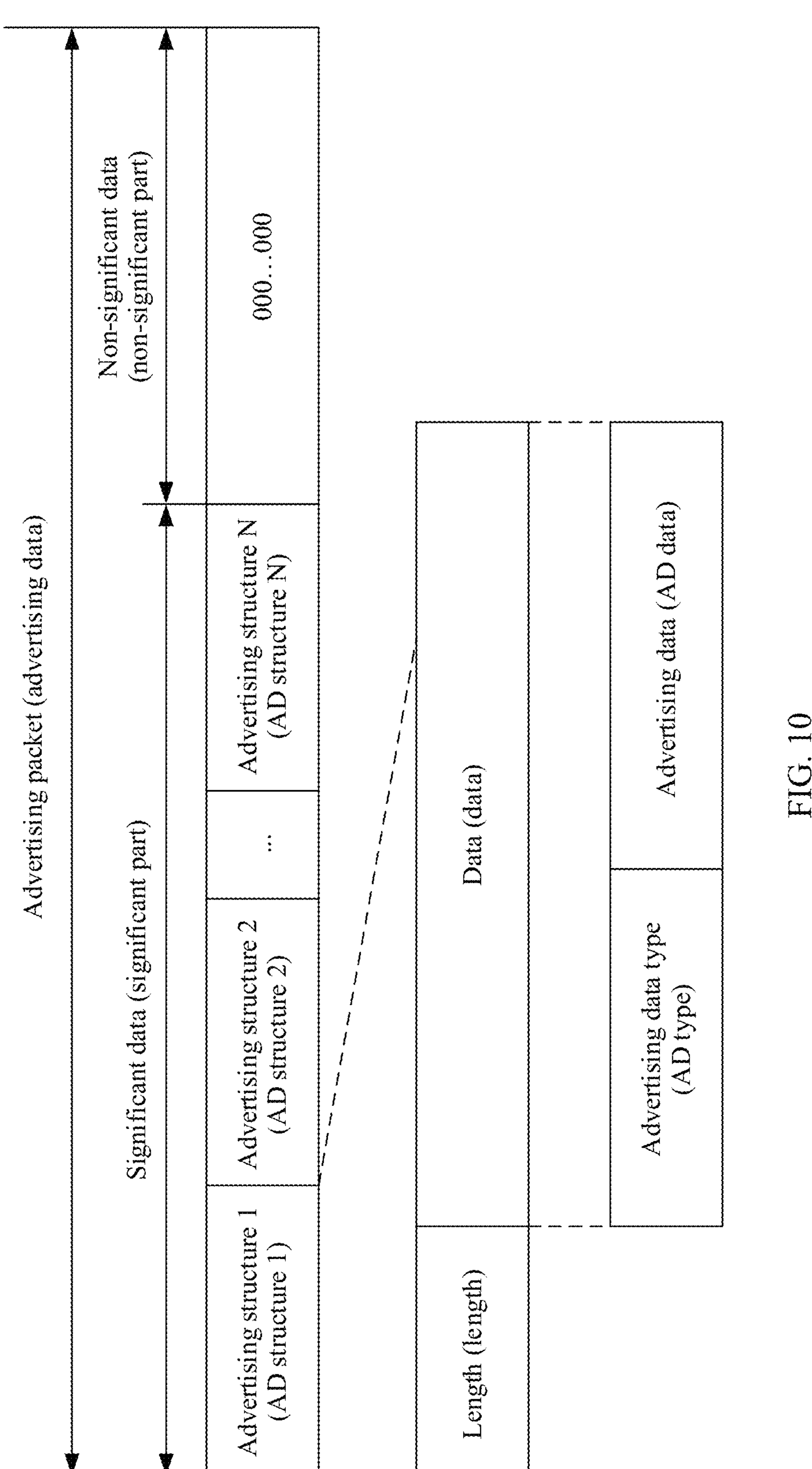
FIG. 10 is a schematic diagram of a data structure of advertising in a Bluetooth protocol according to this application.

A data format of BLE advertising is shown in FIG. 10. A BLE advertising packet includes a significant part and a non-significant part, and the significant part includes one or more advertising structures (AD structures). The advertising structure includes a length and data, the length is used to indicate a length of the data, and the data includes an advertising data (AD data) field and an advertising data type (AD type) field. The advertising data field is used to carry advertising data, and the advertising data type field is used to indicate a type of the advertising data. It can be understood that a length of each BLE advertising packet is 31 bytes. If a length of the significant part is less than 31 bytes, 0 is used for padding and this part of padded data is non-significant data.

In some embodiments, if there is only one earbud in the headset storage box 103, and the other earbud is not within a connection range of the mobile phone 200. For example, there is only the first earbud 101 in the headset storage box. There are two cases. A case 1 is as follows: If the first earbud 101 and the second earbud 102 have been paired with each other by a manufacturer in advance or have been paired with each other before being used this time, the first earbud 101 and the second earbud 102 each have stored a MAC address of the other party. A case 2 is as follows: The first earbud 101 and the second earbud 102 have not been paired with each other. It can be understood that the headset storage box 103 may determine whether the earbuds are in the box. If the two earbuds are both in the headset storage box 103, information is sent to the first earbud 101 and the second earbud 102 in a wired or wireless manner, where the information indicates the first earbud 101 and the second earbud 102 to execute a first connection policy. If only one earbud is in the headset storage box 103, the information indicates the earbud in the headset storage box 103 to execute a second connection policy. When the first connection policy uses a BR/EDR manner, the first earbud 101 and the second earbud 102 discover each other in a page scan or inquiry scan manner, and establish a Bluetooth pairing connection by using a page message, a page response message, and the like. The Bluetooth HCL layer of the first earbud 101 uses an HCL_Write_Page_Timeout command to set a Page_Timeout field to a default state, and a time period of a paging timeout in the default state is 5.12 s. To be specific, the first earbud 101 keeps performing paging on the second earbud 102 within 5.12 s, and if a connection has not been established to the second earbud 102 after 5.12 s, the first earbud 101 performs paging on the mobile phone 200.

Figure 11:
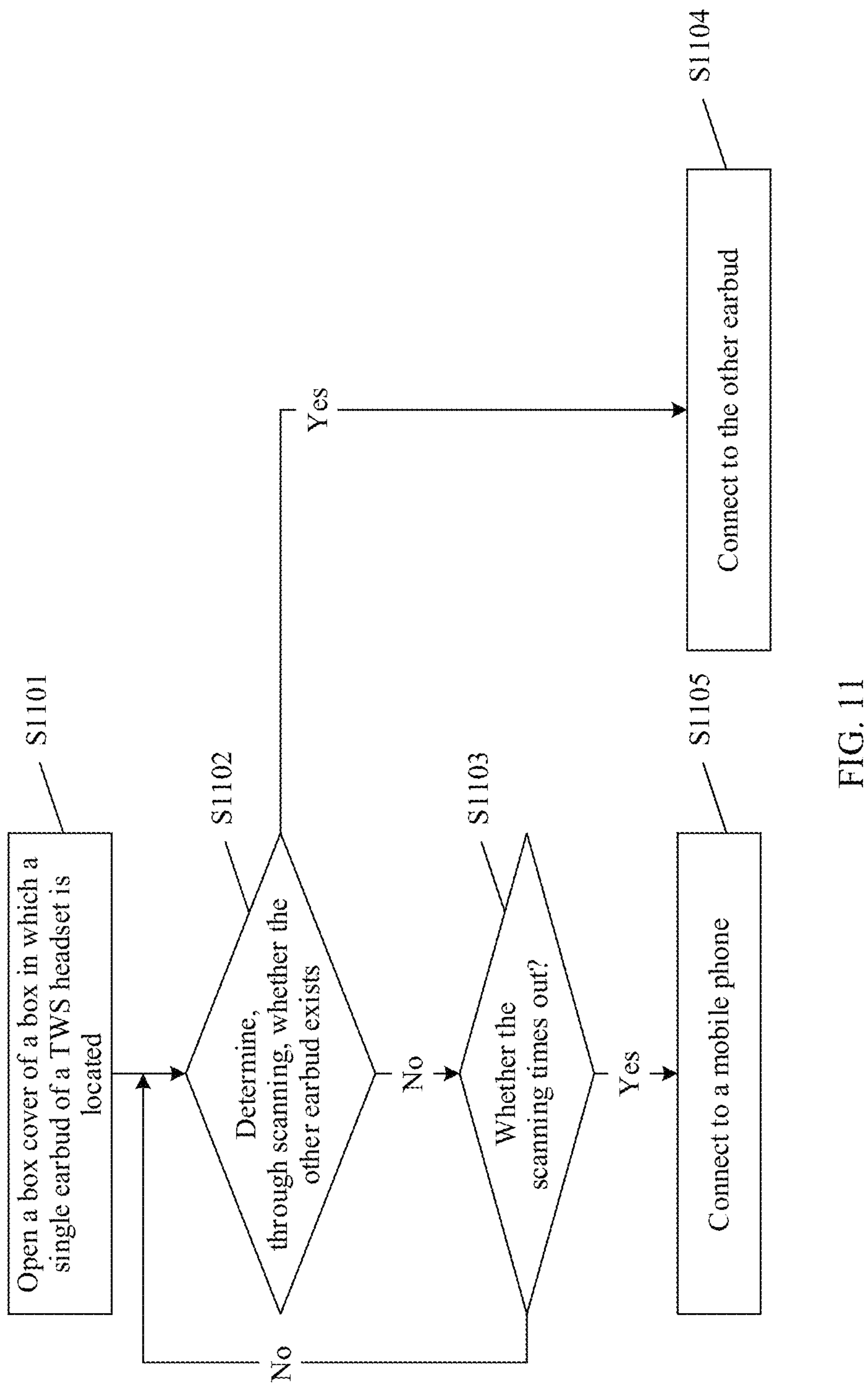
FIG. 11 is a schematic diagram of method operations of connecting a TWS headset to a mobile phone according to this application.

In the case 1, the first earbud 101 executes the second connection policy. As shown in FIG. 11, in operation S1101, when the headset storage box 103 is opened, or after the first earbud 101 is taken out of the headset storage box 103, the first earbud 101 and the second earbud 102 discover each other through BLE advertising. A status of the first earbud 101 is set to a scanning state, and a scanning duty cycle is set to 100%. To be specific, a scanWindow parameter of the first earbud 101 is set to be the same as a scanInterval parameter of the first earbud 101, and the scanWindow parameter is set to be greater than an advertising period (advInterval+advDelay) of the second earbud 102. In operation S1102, if the second earbud 102 is within a range that can be found by the first earbud 101 through scanning, the first earbud 101 definitely can receive a PDU of an ADV_IND type advertised by the second earbud 102, and performs operation S1104; or if the second earbud 102 is not found, performs operation S1103. In operation S1103, the first earbud 101 determines whether scanning duration exceeds the advertising period of the second earbud 102, and if the scanning duration exceeds the advertising period, performs operation S1105; or if the scanning duration does not exceed the advertising period, continues scanning. In operation S1105, because the scanning duration of the first earbud 101 exceeds the advertising period of the second earbud 102, the first earbud 101 initiates a Bluetooth connection to the mobile phone 200. In operation S1104, because the first earbud 101 finds the second earbud 102, the first earbud 101 initiates a Bluetooth connection to the second earbud 102.

Compared with the first connection policy, the second connection policy executed by the TWS headset has the following two advantages: A connection speed is fast. If the first connection policy is used, when the second earbud 102 is not within the connection range, the first earbud 101 can be connected to the mobile phone 200 only after 5.12 s. Consequently, a user waits for a long time. When the second connection policy is executed, the advertising period of the second earbud 102 may be at least 3.75 ms. Because scanWindow of the first earbud 101 only needs to be greater than the advertising period of the second earbud 102, the scanning duration of the first earbud can be shortened to milliseconds. Executing the second connection policy can greatly increase a connection speed of the TWS earbuds. In addition, power consumption is reduced. Because power consumed by paging is greater than power consumed by scanning and advertising, power consumption of the TWS headset device can be greatly reduced in a BLE advertising and scanning manner.

Figure 12:
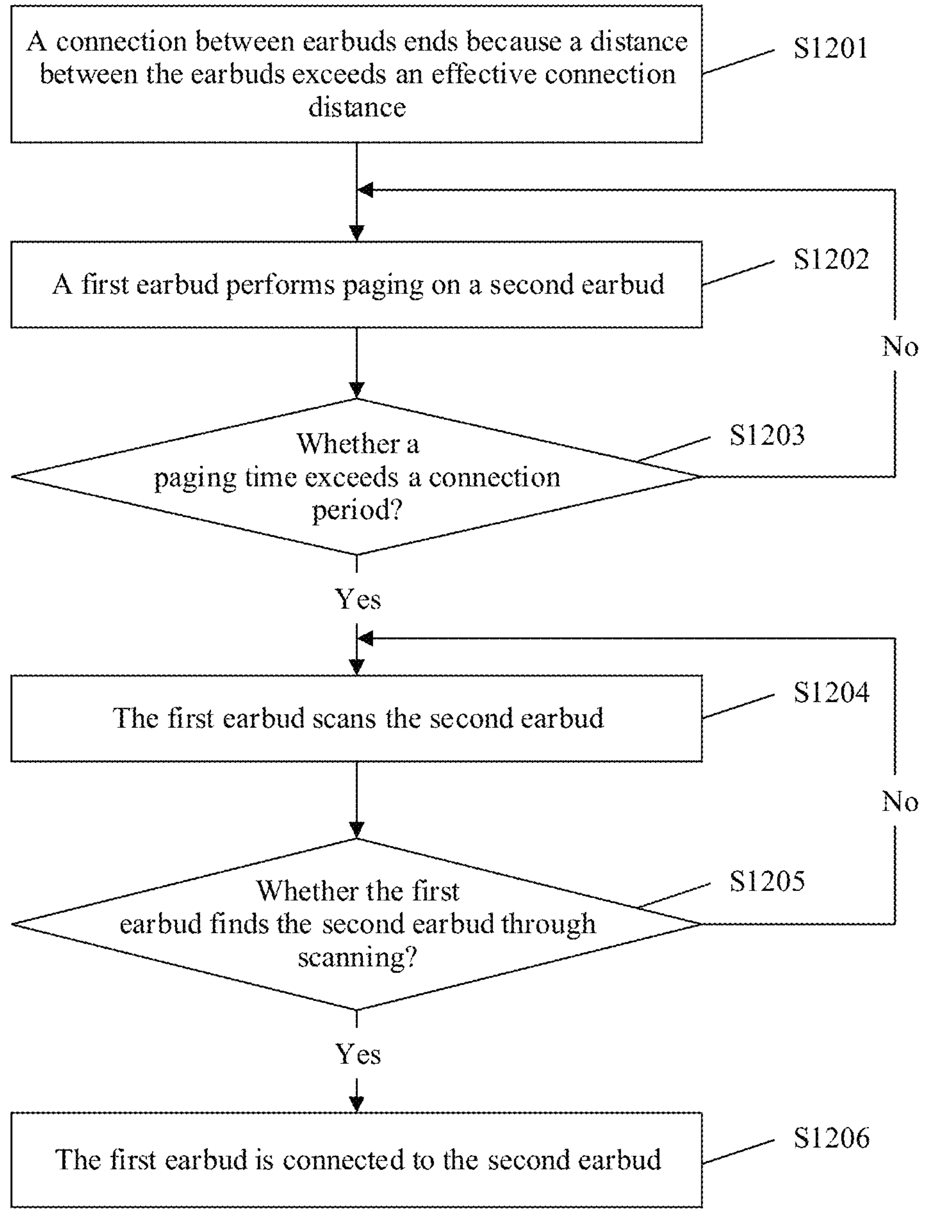
FIG. 12 is a schematic diagram of method operations of connecting a TWS headset to a mobile phone in a special case according to this application.

In some embodiments, after the first earbud 101 establishes the Bluetooth connection to the second earbud 102, if a distance between the first earbud 101 and the second earbud 102 exceeds an effective range of the Bluetooth connection, the Bluetooth connection between the first earbud 101 and the second earbud 102 ends. It can be understood that, in addition to Bluetooth connection ending caused by a distance between devices exceeding an effective connection distance, a timeout disconnection caused by a link abnormality is further included. In the foregoing case, the first earbud 101 may execute a third connection policy. To be specific, the first earbud 101 first initiates paging to the second earbud 102 continuously in a short time, and if the second earbud 102 remains unconnected, an interval time between every two times of adjacent paging is increased. For example, an initial interval time is to, an interval time for nth paging is $t_n$, and the interval time $t_n$ is greater than an interval time $t_{n-t}$. For example, after the first earbud 101 ends the connection to the second earbud 102, a paging interval is set to 5 s. If a connection still fails after two times of paging, the paging interval is set to 10 s. If a connection still fails after four times of paging, the paging interval is set to 1 minute until the connection succeeds. The first earbud 101 may further execute a fourth connection policy. As shown in FIG. 12, in operation 51201, after the first earbud 101 establishes a connection to the second earbud 102, because a distance between the two earbuds exceeds an effective connection distance, the Bluetooth connection between the two earbuds ends. Operation S1202: The first earbud 101 initiates paging to the second earbud 102, sets a paging interval to p1, and sets a connection period to t. Operation 51203: The first earbud 101 determines whether a paging time exceeds the connection period, and if the paging time does not exceed the connection period, continues paging; or if the paging time exceeds the connection period, performs operation S1204. In operation S1204, the first earbud 101 enters a scanning state by using the BLE protocol, and scans advertising made by the second earbud 102. scanInterval is set to p2, and a PDU advertised by the second earbud 102 is ADV_IND. Operation 51205: The first earbud 101 determines whether the second earbud 102 is found through scanning. If the first earbud 101 finds, through scanning, ADV_IND advertised by the second earbud 102, the first earbud 101 performs operation S1206. If the first earbud 101 does not find, through scanning, the PDU advertised by the second earbud 102, the first earbud 101 performs operation S1024 again, to continue scanning the advertising made by the second earbud 102. Operation S1206: The first earbud 101 finds, through scanning, the advertising made by the second earbud 102, and sends a PDU of CONN REQ to the second earbud 102. After receiving the PDU of CONN REQ, the second earbud 102 starts an Rx window, and the first earbud 101 starts a Tx window. The second earbud 102 returns a PDU of an ACK to the first earbud 101 after a time of T_IFS. If the first earbud 101 receives the PDU of the ACK, the first earbud 101 is successfully connected to the second earbud 102.

In comparison with executing the third connection policy, executing the fourth connection policy by the TWS headset can reduce power consumption, and avoid blind paging performed by the first earbud 101. In addition, the fourth connection policy can shorten the connection period, so that the first earbud 101 can be quickly connected to the second earbud 102.

What is claimed is:

1. A true wireless stereo (TWS) headset connection method, comprising:

performing, by a first earbud, a scanning at a first scanning duty cycle, wherein the first scanning duty cycle is 100%, wherein a TWS headset comprises the first earbud and a second earbud;

performing, by the second earbud, an advertising;

if the first earbud does not find the advertising through the scanning, determining whether a scanning duration of the first earbud exceeds an advertising period of the second earbud;

if the scanning duration of the first earbud exceeds the advertising period of the second earbud, connecting, by the first earbud, to an electronic device that has performed a Bluetooth pairing with the first earbud a last time; and if the scanning duration of the first earbud does not exceed the advertising period of the second earbud, continuing, by the first earbud, the scanning.

2. The method according to claim 1, wherein the TWS headset further comprises a headset storage box, and the headset storage box stores the first earbud and the second earbud.

3. The method according to claim 2, wherein the first earbud performs the scanning at the first scanning duty cycle when the first earbud is taken out of the headset storage box.

4. The method according to claim 1, wherein a scanWindow parameter of the first earbud is set to be greater than the advertising period of the second earbud.

5. The method according to claim 1, wherein if the first earbud finds, through the scanning, the advertising made by the second earbud, the first earbud initiates a Bluetooth connection to the second earbud; and the first earbud establishes the Bluetooth connection to the second earbud.

6. The method according to claim 5, wherein after the first earbud establishes the Bluetooth connection to the second earbud, if a distance between the first earbud and the second earbud exceeds an effective range of the Bluetooth connection, the Bluetooth connection between the first earbud and the second earbud ends; the first earbud initiates a paging to the second earbud within an interval time $t_n$, wherein a quantity of paging times is n, and the interval time $t_n$ is greater than an interval time $t_{n-1}$; and when the first earbud performs the paging for an $n^{th}$ time, the first earbud establishes a Bluetooth connection to the second earbud.

7. The method according to claim 5, wherein after the first earbud establishes the Bluetooth connection to the second earbud, if a distance between the first earbud and the second earbud exceeds an effective range of the Bluetooth connection, the Bluetooth connection between the first earbud and the second earbud ends; the first earbud initiates a paging to the second earbud, wherein a paging period is t; and if the first earbud and the second earbud fail in establishing a Bluetooth connection within the period t, the first earbud enters a scanning state, and scans the advertising by the second earbud.

8. A true wireless stereo (TWS) headset, comprising:

a first earbud, a second earbud, and a headset storage box, wherein a microphone and a telephone receiver are disposed on both the first earbud and the second earbud; and wherein the first earbud, the second earbud, and the headset storage box further comprise: a wireless communication module; one or more processors; a memory; and one or more computer programs, wherein the one or more computer programs are stored in the memory, the one or more computer programs comprise instructions, and when the instructions are executed by the TWS headset, the TWS headset is configured to perform operations:

performing, by the first earbud, a scanning at a first scanning duty cycle, wherein the first scanning duty cycle is 100%;

performing, by the second earbud, an advertising;

if the first earbud does not find the advertising through the scanning, determining whether a scanning duration of the first earbud exceeds an advertising period of the second earbud;

if the scanning duration of the first earbud exceeds the advertising period of the second earbud, connecting, by the first earbud, to an electronic device that has performed a Bluetooth pairing with the first earbud a last time; and if the scanning duration of the first earbud does not exceed the advertising period of the second earbud, continuing, by the first earbud, the scanning.

9. The TWS headset according to claim 8, wherein the headset storage box stores the first earbud and the second earbud.

10. The TWS headset according to claim 9, wherein the first earbud performs the scanning at the first scanning duty cycle when the first earbud is taken out of the headset storage box.

11. The TWS headset according to claim 8, wherein a scanWindow parameter of the first earbud is set to be greater than the advertising period of the second earbud.

12. The TWS headset according to claim 8, wherein when the instructions are executed by the TWS headset, the TWS headset is further configured to perform the operations of:

if the first earbud finds, through scanning, the advertising made by the second earbud, the first earbud initiates a Bluetooth connection to the second earbud; and the first earbud establishes the Bluetooth connection to the second earbud.

13. The TWS headset according to claim 12, wherein when the instructions are executed by the TWS headset, the TWS headset is further configured to perform the operations of:

after the first earbud establishes the Bluetooth connection to the second earbud, if a distance between the first earbud and the second earbud exceeds an effective range of the Bluetooth connection, the Bluetooth connection between the first earbud and the second earbud ends; the first earbud initiates a paging to the second earbud within an interval time $t_n$, wherein a quantity of paging times is n, and the interval time $t_n$ is greater than an interval time $t_{n-1}$; and when the first earbud performs the paging for an $n^{th}$ time, the first earbud establishes a Bluetooth connection to the second earbud.

14. The TWS headset according to claim 12, wherein when the instructions are executed by the TWS headset, the TWS headset is further configured to perform the operations of:

after the first earbud establishes the Bluetooth connection to the second earbud, if a distance between the first earbud and the second earbud exceeds an effective range of the Bluetooth connection, the Bluetooth connection between the first earbud and the second earbud ends; the first earbud initiates paging to the second earbud, wherein a paging period is t; and if the first earbud and the second earbud fail in establishing a Bluetooth connection within the period t, the first earbud enters a scanning state, and scans the advertising by the second earbud.

15. A non-transitory computer-readable storage medium, wherein the computer-readable storage medium stores a computer program, and when the computer program is run on a true wireless stereo (TWS) headset, the TWS headset performs the operations of:

performing, by a first earbud, a scanning at a first scanning duty cycle, wherein the first scanning duty cycle is 100%, wherein the TWS headset comprises the first earbud and a second earbud;

performing, by the second earbud, an advertising;

if the first earbud does not find the advertising through the scanning, determining whether a scanning duration of the first earbud exceeds an advertising period of the second earbud;

if the scanning duration of the first earbud exceeds the advertising period of the second earbud, connecting, by the first earbud, to an electronic device that has performed a Bluetooth pairing with the first earbud a last time; and if the scanning duration of the first earbud does not exceed the advertising period of the second earbud, continuing, by the first earbud, the scanning.

16. The computer-readable storage medium according to claim 15, wherein the TWS headset further comprises a headset storage box, and the headset storage box stores the first earbud and the second earbud.

17. The computer-readable storage medium according to claim 16, wherein the first earbud performs the scanning at the first scanning duty cycle when the first earbud is taken out of the headset storage box.

18. The computer-readable storage medium according to claim 15, wherein a scanWindow parameter of the first earbud is set to be greater than the advertising period of the second earbud.

19. The computer-readable storage medium according to claim 15, wherein when the computer program is run on the TWS headset, the TWS headset further performs the operations of:

if the first earbud finds, through scanning, the advertising made by the second earbud, the first earbud initiates a Bluetooth connection to the second earbud; and the first earbud establishes the Bluetooth connection to the second earbud.

20. The computer-readable storage medium according to claim 19, wherein when the computer program is run on the TWS headset, the TWS headset further performs the operations of:

after the first earbud establishes the Bluetooth connection to the second earbud, if a distance between the first earbud and the second earbud exceeds an effective range of the Bluetooth connection, the Bluetooth connection between the first earbud and the second earbud ends; the first earbud initiates a paging to the second earbud within an interval time $t_n$, wherein a quantity of paging times is n, and the interval time $t_n$ is greater than an interval time $t_{n-1}$; and when the first earbud performs the paging for an $n^{th}$ time, the first earbud establishes a Bluetooth connection to the second earbud.

* * * * *